United States Patent
Lee et al.

(10) Patent No.: US 9,996,759 B2
(45) Date of Patent: Jun. 12, 2018

(54) METHOD AND APPARATUS FOR RECOGNIZING FINGERPRINT

(71) Applicant: Samsung Electronics Co., Ltd., Gyeonggi-do (KR)

(72) Inventors: Hansol Lee, Gyeonggi-do (KR); Changsoo Kim, Seoul (KR); Yanggu Jo, Gyeonggi-do (KR)

(73) Assignee: Samsung Electronic Co., Ltd. (KR)

( * ) Notice: Subject to any disclaimer, the term of this patent is extended or adjusted under 35 U.S.C. 154(b) by 419 days.

(21) Appl. No.: 14/626,492

(22) Filed: Feb. 19, 2015

(65) Prior Publication Data

US 2015/0235098 A1    Aug. 20, 2015

(30) Foreign Application Priority Data

Feb. 19, 2014   (KR) ........................ 10-2014-0019340

(51) Int. Cl.
  *G06F 3/0488*  (2013.01)
  *G06K 9/00*   (2006.01)
  *G06F 3/0484*  (2013.01)

(52) U.S. Cl.
  CPC ....... *G06K 9/00912* (2013.01); *G06F 3/0484* (2013.01); *G06F 3/04883* (2013.01); *G06K 9/0002* (2013.01); *G06K 9/00087* (2013.01)

(58) Field of Classification Search
  CPC ... H04L 63/0861; G06F 21/32; G06F 3/0416; G06F 2203/04106; G06F 2203/0338;
  (Continued)

(56) References Cited

U.S. PATENT DOCUMENTS 7,099,496 B2 *   8/2006   Benkley, III ......... G06K 9/0002
                                                324/661
9,158,410 B2 *  10/2015   Hare ..................... G06F 3/0416
                              (Continued)

FOREIGN PATENT DOCUMENTS

EP       2 551 790        1/2013
JP     2013-105222        5/2013
                              (Continued)

OTHER PUBLICATIONS

Haiying Guan et al., "Real-time Feedback for Usable Fingerprint Systems", 2011 International Joint Conference on Biometrics, IEEE, Oct. 11, 2011, 8 pages.
(Continued)

*Primary Examiner* — Tadesse Hailu
(74) *Attorney, Agent, or Firm* — The Farrell Law Firm, P.C.

(57) ABSTRACT

A method and apparatus for recognizing a fingerprint. The method includes displaying a guide area corresponding to a finger touch in at least one area of a display unit; and providing guide information related to fingerprint recognition based on a touch detected via the guide area. The apparatus includes a display unit configured to display a guide area corresponding to a finger touch in at least one area in a fingerprint mode; an input unit configured to detect a touch input, wherein the input unit is integrally configured with the display unit; a fingerprint scan sensor located in an area adjacent to the guide area of the display unit; and a controller configured to provide guide information related to fingerprint recognition based on a touch detected via the guide area in the fingerprint mode.

24 Claims, 20 Drawing Sheets

(58) Field of Classification Search
CPC .... G06F 21/31; G06F 3/0484; G06F 3/04883; G06K 9/0002; G06K 9/00087; G06K 9/00912
See application file for complete search history.

(56) References Cited

U.S. PATENT DOCUMENTS

| | | | |
|---|---|---|---|
| 2004/0161135 A1* | 8/2004 | Sano | G06K 9/00087 382/124 |
| 2006/0093192 A1* | 5/2006 | Bechtel | G06K 9/00013 382/126 |
| 2009/0083847 A1 | 3/2009 | Fadell et al. | |
| 2010/0112984 A1* | 5/2010 | Fyke | G06F 1/1626 455/411 |
| 2010/0220900 A1* | 9/2010 | Orsley | G06F 3/0421 382/124 |
| 2010/0225443 A1* | 9/2010 | Bayram | G06F 21/316 340/5.83 |
| 2010/0303311 A1 | 12/2010 | Shin et al. | |
| 2011/0098056 A1* | 4/2011 | Rhoads | G01C 21/20 455/456.1 |
| 2012/0127179 A1* | 5/2012 | Aspelin | G06F 21/32 345/441 |
| 2013/0201155 A1 | 8/2013 | Wu et al. | |
| 2013/0279769 A1* | 10/2013 | Benkley, III | G06K 9/00013 382/124 |
| 2013/0287272 A1 | 10/2013 | Lu et al. | |
| 2015/0074615 A1* | 3/2015 | Han | G06K 9/00033 715/863 |
| 2015/0135108 A1* | 5/2015 | Pope | G06K 9/00006 715/767 |
| 2016/0283772 A1* | 9/2016 | Nelson | G06F 3/0421 |

FOREIGN PATENT DOCUMENTS

| | | |
|---|---|---|
| KR | 10-2013-0129914 | 11/2013 |
| KR | 10-1331480 | 11/2013 |

OTHER PUBLICATIONS

European Search Report dated Aug. 3, 2015 issued in counterpart application No. 15154824.5-1901, 11 pages.
Zia Saquib et al., "A Cascaded Fingerprint Quality Assessment Scheme for Improved System Accuracy", Online, IJCSI International Journal of Computer Science Issues, www.IJCSI.org, vol. 8, Issue 2, Mar. 2011, 7 pages.
European Search Report dated Mar. 28,2018 issued in counterpart application No. 15154824.5-1207, 7 pages.

* cited by examiner

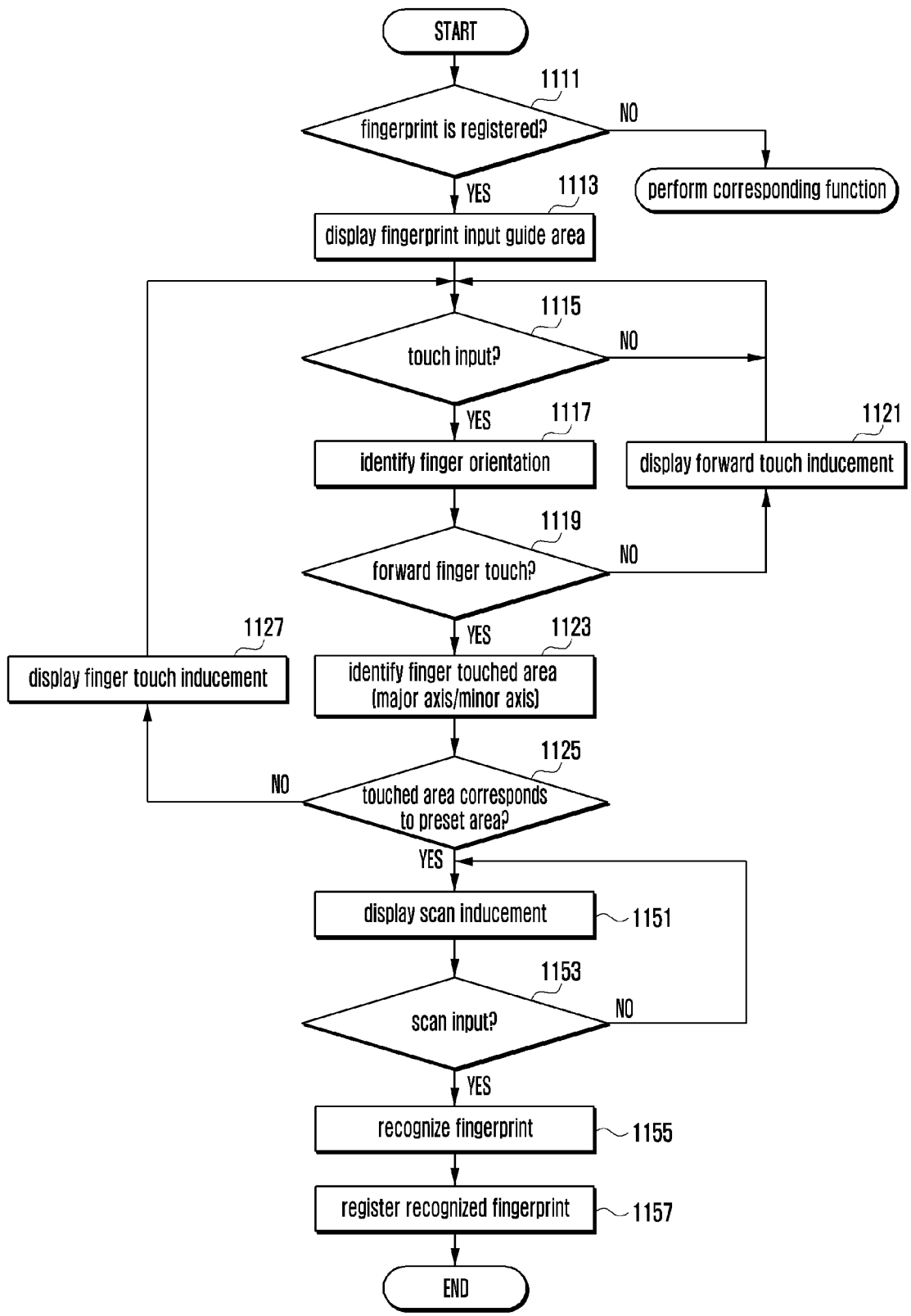

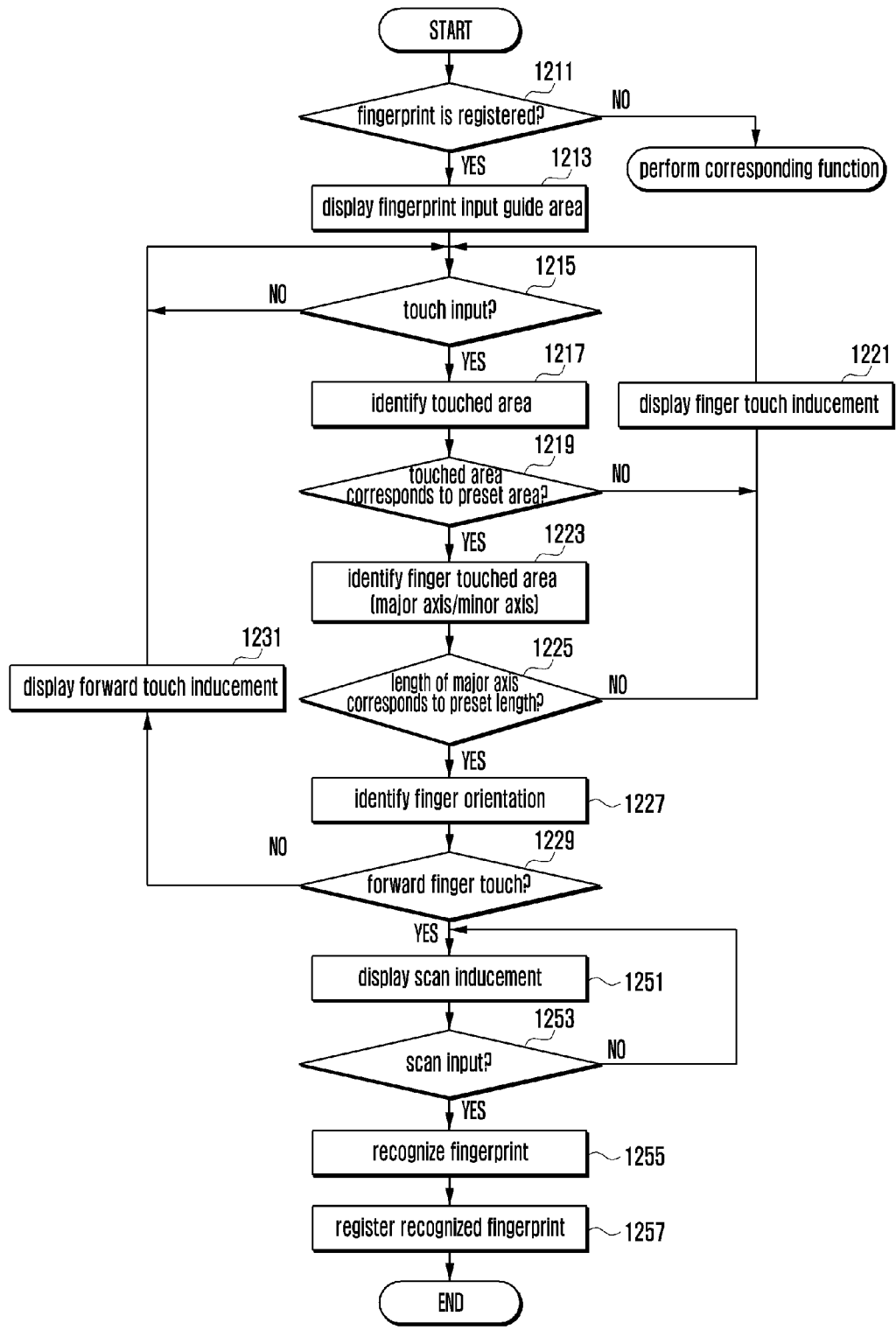

METHOD AND APPARATUS FOR RECOGNIZING FINGERPRINT

PRIORITY

This application claims priority under 35 U.S.C. § 119(a) to a Korean Patent Application filed on Feb. 19, 2014 in the Korean Intellectual Property Office and assigned Serial No. 10-2014-0019340, the entire contents of which are incorporated herein by reference.

BACKGROUND

1. Field of the Invention

The present invention relates generally to an apparatus and a method for recognizing a fingerprint in an electronic device, and more particularly, to an apparatus and a method of recognizing a fingerprint by displaying a guide area and providing guide information based on a touch detected via the guide area.

2. Description of the Related Art

Electronic devices may have a communication function, and may also have various functions other than a communication function. An electronic device stores not only data such as contacts, call history, and messages, but also position information of a user, favorite games, frequently visited web sites, photographs, important memos, and financial transaction information. Further, an electronic device may perform various communication functions using stored information. Accordingly, an electronic device may perform various functions based on complex functions of the electronic device. However, since an electronic device stores private information, private and personal information may be leaked, and the security thereof may be fragile.

Current electronic devices may have various security functions to protect personal information, and the security functions may include a fingerprint recognition method. A security function using a fingerprint recognition method has been used in other fields as a security function.

SUMMARY

The present invention has been made to address the above-mentioned problems and disadvantages, and to provide at least the advantages described below. Accordingly, an aspect of the present invention provides a method and apparatus for recognizing a fingerprint.

In accordance with an aspect of the present disclosure, a method of recognizing a fingerprint is provided. The method includes displaying a guide area corresponding to a finger in at least one area of a display unit; and providing guide information related to fingerprint recognition based on a touch detected via the guide area.

In accordance with another aspect of the present disclosure, an apparatus for recognizing a fingerprint is provided. The apparatus includes a display unit configured to display a guide area corresponding to a finger in at least one area in a fingerprint mode; an input unit configured to detect a touch input, wherein the input unit is integrally configured with the display unit; a fingerprint scan sensor located in an area adjacent to the guide area of the display unit; and a controller configured to provide guide information related to fingerprint recognition based on a touch detected via the guide area in the fingerprint mode.

In accordance with another aspect of the present disclosure, a method of registering a fingerprint by an electronic device is provided. The method includes displaying a guide area for a finger touch in a fingerprint mode on a display unit and displaying information instructing a user to place a finger in the guide area; analyzing a touched area and a preset area when a touch is detected in the guide area; displaying information instructing a larger finger touch when the touched area is less than the preset area; and collecting fingerprint information corresponding to the touch via a fingerprint scan sensor located at a lower portion of the guide area when the touched area is greater than the preset area.

In accordance with another aspect of the present disclosure, a non-transitory computer-readable recording medium implemented in an electronic device including a fingerprint scan sensor is provided. The non-transitory computer-readable recording medium displays a guide area corresponding to a finger touch in at least one area of a display unit and provides guide information related to fingerprint recognition based on a touch detected via the guide area.

In accordance with another aspect of the present disclosure, a non-transitory computer-readable recording medium implemented in an electronic device including a fingerprint scan sensor is provided. The non-transitory computer-readable recording medium displays a guide area for a finger touch in a fingerprint mode on a display unit, displays information instructing a user to place a finger in the guide area, analyzes a touched area and a preset area when a touch is detected in the guide area, displays information instructing a larger finger touch when the touched area is less than the preset area, displays a beginning of a fingerprint scan via a fingerprint scan sensor located at a lower portion of the guide area when the touched area is greater than the preset area, and recognizes and registers scanned fingerprint information.

BRIEF DESCRIPTION OF THE DRAWINGS

The above and other aspects, features and advantages of the present invention will be more apparent from the following detailed description, taken in conjunction with the accompanying drawings, in which:

FIG. 11 is a flowchart of a fingerprint recognition method via an inducement of a finger touch while analyzing a finger touch orientation and a major axis/minor axis of the touched area in an electronic device according to an embodiment of the present invention;

FIG. 12 is a flowchart illustrating a fingerprint recognition method via an inducement of a finger touch while analyzing a finger touched area, lengths of a major axis/minor axis of the touched area, and orientations of the touched area in an electronic device according to an embodiment of the present invention;

DETAILED DESCRIPTION OF THE EMBODIMENTS OF THE PRESENT INVENTION

Figure 1:
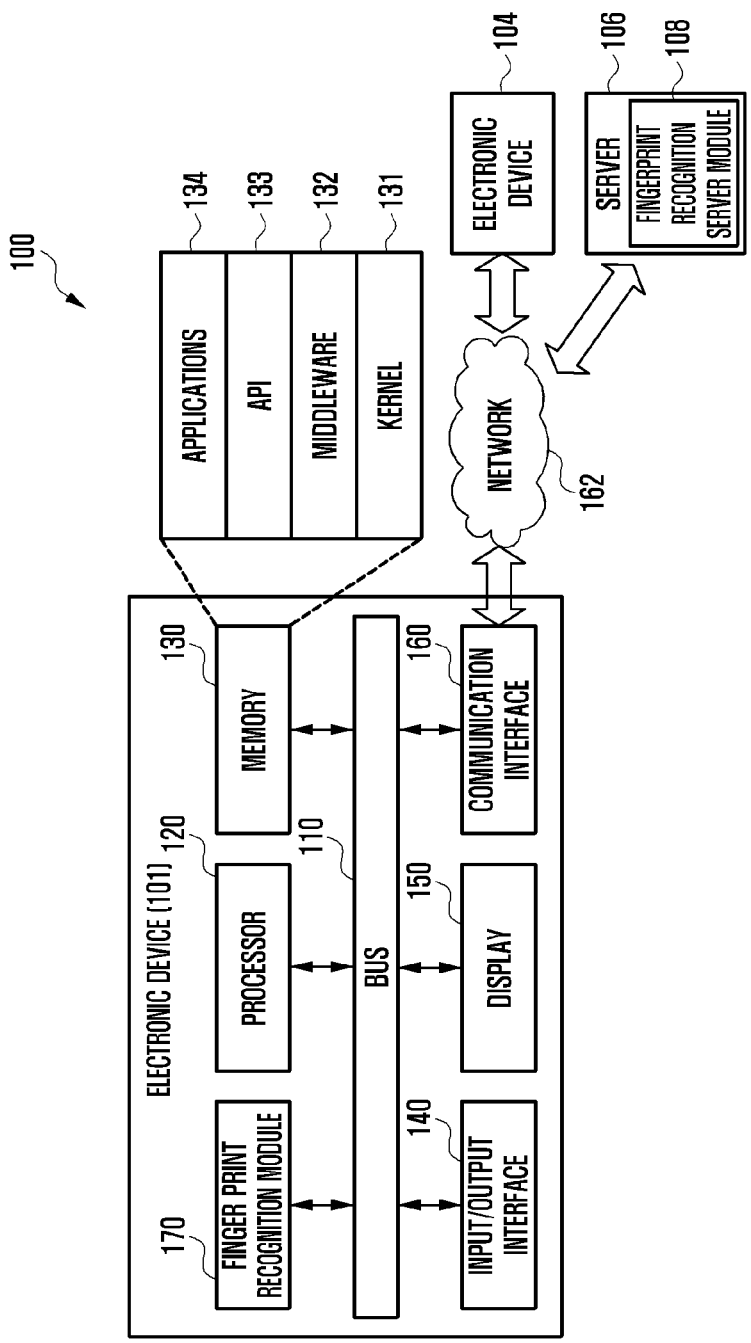
FIG. 1 is a block diagram of a network environment including an electronic device according to an embodiment of the present invention.

Embodiments of the present invention are described below in detail with reference to the accompanying drawings. Various changes may be made to the present invention, and the present invention may have various forms, where embodiments of the present invention are illustrated in the drawings and described below in detail. However, an embodiment of the present invention is not intended to limit the present invention, and it should be understood that the present invention includes all changes, equivalents, and substitutes within the spirit and scope of the present invention. Throughout the drawings, like reference numerals refer to like components.

It will be understood that the expressions "comprises" and "may comprise" may be used to specify presence of disclosed function, operation, component, etc, but do not preclude the presence of one or more functions, operations, components, etc. It will be further understood that the terms "comprises" and/or "has" may be used to specify the presence of stated feature, number, step, operation, component, element, or a combination thereof but do not preclude the presence or addition of one or more other features, numbers, steps, operations, components, elements, or combinations thereof. In the present invention, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and, likewise, a second component may also be referred to as a first component, without departing from the teaching of the inventive concept.

It will be understood that when an element or layer is referred to as being "on" °, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the present invention. As used herein, the singular forms "a," "an" and "the" are intended to include the plural forms as well, unless the context clearly indicates otherwise.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An electronic device according to an embodiment of the present invention is a device having a finger recognition function.

The electronic device includes a smartphone, a table Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g. Head-Mounted Device (HMD) such as electronic glasses, electronic clothing, electronic bracelet, electronic necklace, electronic appcessory, electronic tattoo, smartwatch, etc).

According to an embodiment of the present invention, the electronic device includes a smart home appliance with a fingerprint function. According to an embodiment of the present invention, the electronic device includes one of a smart home appliances having an operation support function. Examples of the smart home appliance as an electronic device includes a television (TV), a Digital Video Disk (DVD) player, an audio player, a refrigerator, an air-conditioner, a vacuum cleaner, an electronic oven, a microwave oven, a washing machine, a clothes dryer, an air cleaner, a set-top box, a TV box (e.g. Samsung HomeSync™, Apple TV™, and Goggle TV™), game console, an electronic dictionary, an electronic key, a camcorder, and an electronic frame, etc.

According to an embodiment of the present invention, the electronic device includes a medical device (e.g. Magnetic Resonance Angiography (MRA), Magnetic Resonance Imaging (MRI), Computed Tomography (CT)), a navigation device, a Global Positioning System (GPS) receiver, an Event Data Recorder (EDR), a Flight Data Recorder (FDR), a car infotainment device, a maritime electronic device (e.g. a maritime navigation device and a gyro compass), an aviation electronic device (e.g. avionics), a security device, a vehicle head unit, an industrial or home robot, an Automatic Teller Machine (ATM) of a financial institution, a Point Of Sale (POS) device, etc.

According to an embodiment of the present invention, the electronic device includes furniture and building/structure having a communication function, electronic board, electronic signature receiving device, projector, and metering device (e.g. water, electric, gas, and electric wave metering devices). According to an embodiment of the present invention, the electronic device includes any combination of the aforementioned devices. According to an embodiment of the present invention, the electronic device may be a flexible device. It is obvious to those skilled in the art that the electronic device is not limited to the aforementioned devices.

Descriptions are made of the electronic devices according to an embodiment of the present invention with reference to the accompanying drawings hereinafter. The term "user" used in an embodiment of the invention may denote a person or a device (e.g. artificial intelligent electronic device) using the electronic device.

FIG. 1 is a block diagram of a network environment 100 including an electronic device 101.

Referring to FIG. 1, the electronic device 101 includes a bus 110, a processor 120, a memory 130, an input/output interface 140, a display 150, a communication interface 160, and a fingerprint recognition module 170.

The bus 110 connects the aforementioned components to each other and may be a circuit for exchanging signals (e.g. control messages) among the components.

For example, the processor 120 receives a command from any of the aforementioned components (e.g. memory 130, input/output interface 140, display 150, communication interface 160, and fingerprint recognition module 170) via the bus 110, interprets the command, and executes an operation or processes data according to the decrypted command.

The memory 130 stores the command or data received from the processor 120 or other components (e.g. input/output interface 140, display 150, communication interface 160, fingerprint recognition module 170, etc) or generated by the processor 120 or other components. The memory 130 stores program modules including a kernel 131, a middleware 132, an Application Programming Interface (API) 133, applications 134, etc. Each program module may be implemented as software, firmware, hardware, and any combination thereof.

The kernel 131 controls or manages the system resources (e.g. the bus 110, the processor 120, and the memory 130) for use in executing the operation or function implemented with the middleware 132, the API 133, or the applications 134. The kernel 131 also provides an interface allowing the middleware 132, API 133, or applications 134 to access the components of the electronic device 101 to control or manage the components.

The middleware 132 operates as a relay of data communicated between the API 133 or applications 134 and the kernel 131. The middle 132 controls the task requests from the applications 134 by assigning priority for using a system resource (e.g., the bus 110, the processor 120, and the memory 130) of the electronic device 101 to at least one of the applications 134.

The API 133 is an interface for the applications 134 to control the function provided by the kernel 131 or the middleware 132 and includes at least one interface or function (e.g. command) for file control, window control, image control, or text control.

According to an embodiment of the present invention, the applications 134 includes a Short Messaging Service/Multimedia Messaging Service (SMS/MMS) application, an email application, a calendar application, an alarm application, a health care application (e.g. an application for measuring a quantity of motion or blood sugar level), and an environmental information application (e.g., atmospheric pressure, humidity, and temperature applications). Additionally or alternatively, the applications 134 may be applications related to information exchange between the electronic device 101 and other external electronic device (e.g. electronic device 104). The information exchange applications include a notification relay application for relaying specific information to the external electronic device 104 and a device management application for managing the external electronic device 104.

For example, the notification relay application may include a function for relaying alarm information generated by the other applications (e.g., SMS/MMS application, email application, health care application, and environmental information application) of the electronic device 101 to an external electronic device (e.g. external electronic device 104). Additionally or alternatively, the notification relay application may provide the user with notification information received from an external electronic device (e.g. external electronic device 104). The electronic device 101 applications 134 may manage (e.g. install, delete, and update) the function of an external electronic device (e.g., turn-on/off the external electronic device 104 (or a part of it) or adjust the brightness (or resolution) of the display) which communicates with the electronic device 101 or the service (e.g., communication or messaging service) provided by the external electronic device 104 or an application running on the external electronic device 104.

According to an embodiment of the present invention, the applications 134 include an application designated according to a property (e.g. type) of an external electronic device (e.g. external electronic device 104). If the external electronic device is an MP3 player, the applications 134 include a music playback application. Similarly, if the external electronic device is a mobile medical appliance, the applications 134 include a health care application. According to an embodiment of the present invention, the application 134 includes at least one of the applications designated to the electronic device 101 or the applications received from the external electronic device (e.g., server 106 and external electronic device 104).

The input/output interface 140 delivers a command or data input of the user via an input/output device (e.g., sensor, keyboard, and touchscreen) to the processor 120, the memory 130, the communication interface 160, and/or the fingerprint recognition module 170 via the bus 110. For example, the input/output interface 140 provides the processor 120 with data corresponding to a touch made by the user on a touchscreen. The input/output interface 140 outputs the command or data (which is received from the processor 120, the memory 130, the communication interfaced 160, or the fingerprint recognition module 170 via the bus 110) via the input/output device (e.g., speaker and display). For example, the input/out interface 140 outputs voice data processed by the processor 120 to the user via a speaker.

The display 150 presents information (e.g., multimedia data and text data) to the user.

The communication interface 160 establishes a communication connection for the electronic device 101 with an external electronic device (e.g., external electronic device 104 and server 106). For example, the communication interface 160 connects to the network 162 via a wireless or wired link for communication with the external device. The wireless communication technology includes Wireless Fidelity (Wi-Fi), Bluetooth (BT), Near Field Communication (NFC), Global Positioning System (OPS), and cellular communication technology (e.g., Long Term Evolution (LTE), LTE-Advanced (LTE-A), Code Division Multiple Access (CDMA), Wideband COMA (WCDMA), Universal Mobile Telecommunication System (UMTS), Wireless-Broadband (WiBro), and General System for Mobile communications (GSM)). The wired communication technology includes Universal Serial Biz (USB), High Definition Multimedia Interface (HDMI), Recommended Standard 232 (RS-232), and Plain Old Telephone Service (POTS).

According to an embodiment of the present invention, the network 162 is a telecommunication network. The telecommunication network includes at least one of a computer network, the Internet, the Internet of Things, and a telephone network. According to an embodiment of the present invention, the communication protocol between the electronic device 101 and an external device (e.g., a transport layer protocol, a data link layer protocol, and a physical layer protocol) is supported by at least one of the applications 134, the AFT 133, the middleware 132, the kernel 131, and the communication interface 160.

According to an embodiment of the present invention, the server 106 executes at least one of the operations (or functions) implemented in the electronic device 101 to support the operation of the electronic device 101. For example, the server 106 may include a fingerprint recognition server module 108 capable of supporting the fingerprint recognition module 170 embodied in the electronic device 101. The fingerprint recognition server module 108 includes a part of the fingerprint recognition module 170 to at least perform (e.g. instead of the fingerprint recognition module 170) at least one of the operations that controls the fingerprint recognition module 170.

The fingerprint recognition module 170 processes at least a part of the information acquired from other components (e.g., the processor 120, the memory 130, the input/output interface 140, and the communication interface 160) and provides the user with the processing result in various ways. For example, the fingerprint recognition module 170 may control some functions of the electronic device 101 in order for the electronic device 101 to intemperate with other electronic devices (e.g., the external electronic device 104 and the server 106) using the processor 120 or independently thereof.

According to an embodiment of the present invention, at least some of the functions performed by the electronic device 101 (for example, the fingerprint recognition module 170) may be performed by an external electronic device (for example, the server 106). For example, the server 106 may include the fingerprint recognition server module 108 corresponding to the fingerprint recognition module 170, process at least some of the functions related to user fingerprint recognition using the fingerprint recognition server module 108, and transmit a result thereof to the electronic device 101 (for example, the fingerprint recognition module 170).

Figure 2:
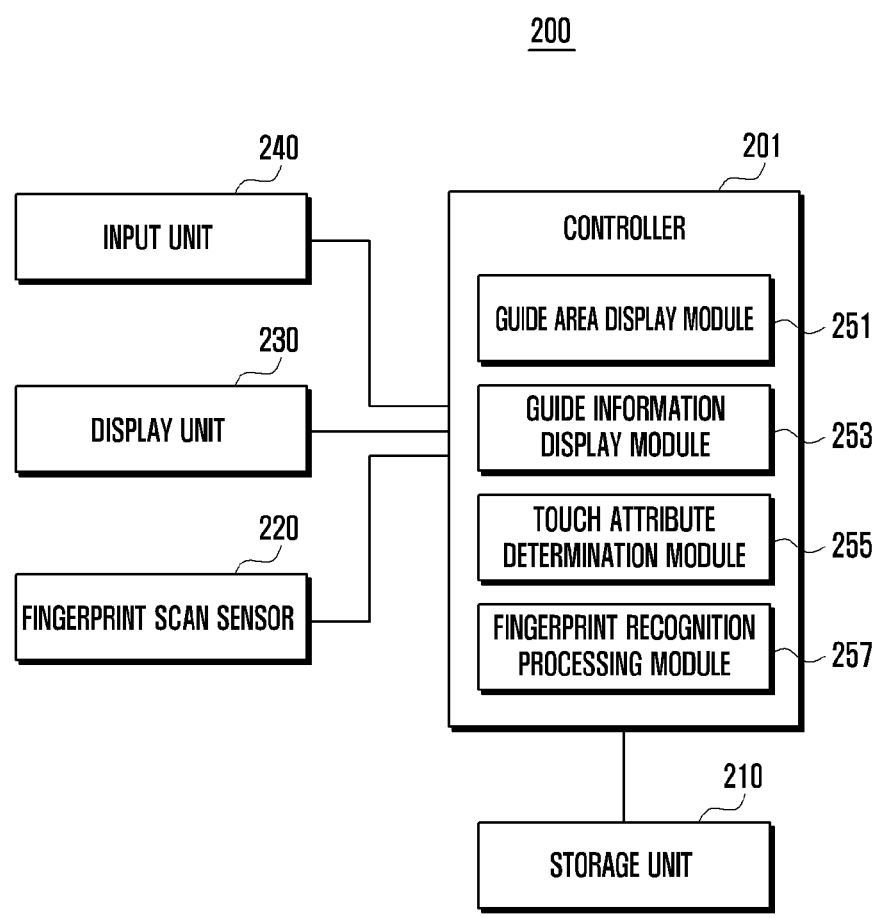
FIG. 2 is a block diagram of an electronic device for fingerprint recognition according to an embodiment of the present invention.

FIG. 2 is a block diagram of an electronic device 200 (for example, the electronic device 101) for fingerprint recognition according to an embodiment of the present invention. The electronic device 200 includes a controller 201, a storage unit 210, a fingerprint scan sensor 220, a display unit 230, and an input unit 240.

Referring to FIG. 2, the fingerprint scan sensor 220 is a sensor for recognizing a user's fingerprint. The fingerprint scan sensor 220 may be located on a front surface of the electronic device 200 on which the display unit 230 is located and may be mounted to an area close to the display unit 230.

The controller 201 may be a hardware module, a software module, or a combination thereof controlled by a processor (for example, an Application Processor (AP). According to an embodiment of the present invention, the controller 201 includes, for example, control logic corresponding to at least some of the functions of the fingerprint recognition module 170 executed by the processor 120.

The controller 201 includes a guide area display module 251, a guide information display module 253, a touch attribute determination module 255, and a fingerprint recognition processing module 257 which performs fingerprint recognition. The guide area display module 251 displays an area for guiding a finger touch in some areas of the display unit 230 in a fingerprint mode. The guide area display module 251 displays the guide area at a position close to the fingerprint scan sensor 220 on the display unit 230. The guide information display module 253 displays guide information according to a fingerprint recognition process in the fingerprint mode. Guide information includes information to induce the placement of a finger in the guide area when the fingerprint mode is set, information to induce a re-touch of a finger when a touch input does not meet a touch attribute, and information to induce the scanning of a fingerprint scan when a touch input meets the touch attribute. The touch attribute determination module 255 determines a finger touch condition by comparing a finger touch input detected by the input unit 240 with a preset attribute reference value. The touch attribute includes at least one of a touch area, a touch angle, and a touch pressure with respect to a touch. The fingerprint recognition processing module 257 recognizes fingerprint information scanned by the fingerprint scan sensor 220.

The controller 201 controls the display of the guide area in the a fingerprint mode, data to induce a touch of a finger in the guide area displayed when a fingerprint is to be registered, data to induce positioning of a finger via analysis of touch information, and data to induce a fingerprint scan when a finger touch meets a preset condition. When a fingerprint is scanned by the fingerprint scan sensor 220, the fingerprint may be recognized and registered. Further, when the fingerprint is input, the controller 201 recognizes the fingerprint scanned by the fingerprint scan sensor 220 and compares the recognized fingerprint with a registered fingerprint, so as to control a preset function. The storage unit 210 (for example, the memory 130) stores operation programs and data and fingerprint information of the electronic device 200.

The display unit 230 (for example, the display 150) displays the guide area under control of the controller 140, and text data for inducing registration of a fingerprint output by the controller 201 when the fingerprint is to be registered. The input unit 240 includes, for example, an input device (for example, the input/output interface 140) such as a touch panel and a key button panel. The touch panel may be implemented by a touch screen integrally configured with the display unit 230, and detects touch inputs on the display unit 230. Further, buttons may be located in a front bezel area of the electronic device 200 or in a side surface of the electronic device 200. A button located at the front bezel area of the electronic device 200 may be a home button.

In the description below, "fingerprint mode" is a term used to include a fingerprint registration mode and a fingerprint input mode. The fingerprint registration mode is a mode in which a fingerprint is initially registered in the electronic device 200, and the fingerprint input mode is a mode in which a fingerprint is input to perform a particular function in a state where the fingerprint has previously been registered. The controller 201 compares an input fingerprint and a registered fingerprint. When an input fingerprint matches a registered fingerprint, the controller 201 performs a corresponding function.

Figure 3:
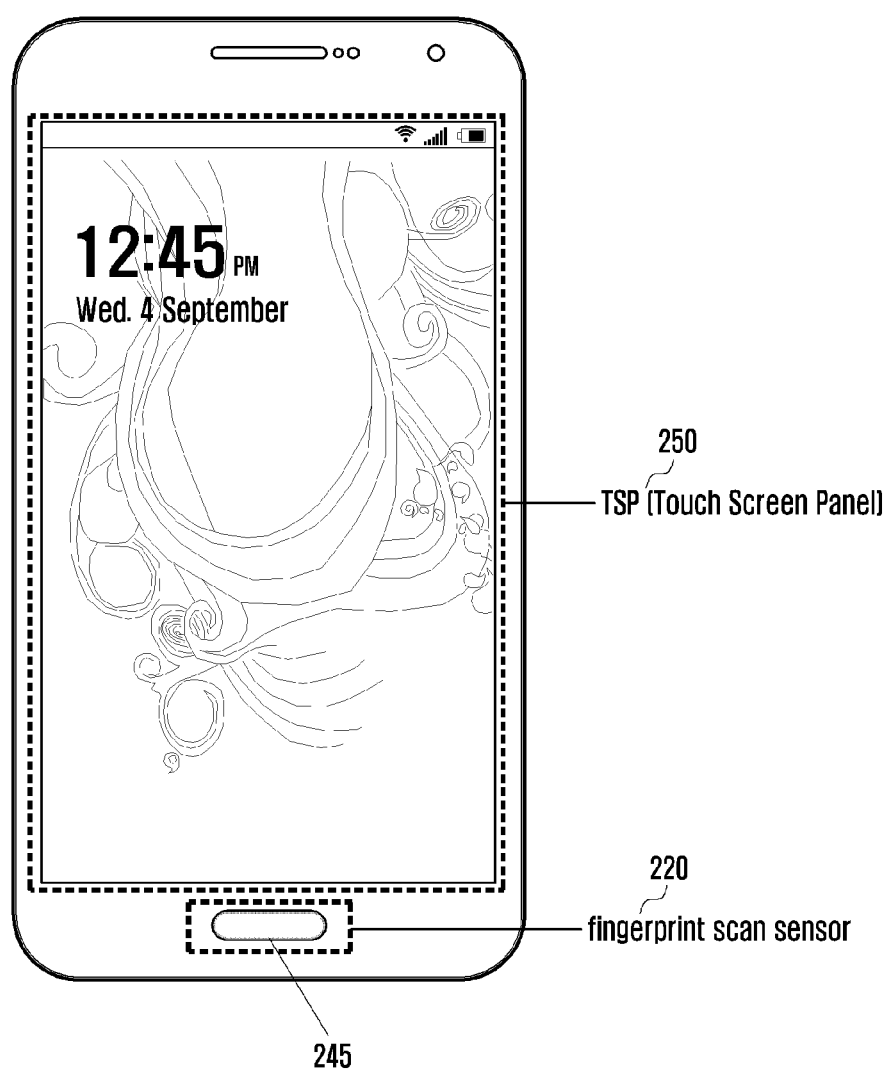
FIG. 3 illustrates a fingerprint scan sensor arranged in an electronic device according to an embodiment of the present invention.

FIG. 3 illustrates a fingerprint scan sensor 220 arranged in the electronic device 200 according to an embodiment of the present invention.

Referring to FIG. 3, the fingerprint scan sensor 220 is installed at a position close to the display unit 230 located on the front surface of the electronic device 200. The fingerprint scan sensor 220 is located on the front surface of the electronic device 220 and may be close to the display unit 230. In an embodiment of the present invention, the fingerprint scan sensor 220 may be located in a lower bezel area of the display unit 230. Further, when the electronic device 220 is a mobile terminal as illustrated in FIG. 3, the fingerprint scan sensor 220 may be installed in the home key 245. Touch Screen Panel 250 may be composed of the display unit 230 and the input unit 240.

The fingerprint scan sensor 220 may have an optical type or semiconductor (or chip) type configuration. An optical type fingerprint scan sensor projects light onto a platen and recognizes an image of a fingerprint reflected according to a pattern of the fingerprint at a fingertip placed upon the platen. When a fingertip directly contacts a chip surface using electrical conduction characteristics of the skin, the semiconductor type fingerprint scan sensor reads a fingerprint pattern of a finger placed upon the chip surface as an electrical signal, that is, uses a biological characteristic. Further, the fingerprint scan sensor 220 may be configured as a touch sensor type. The touch sensor arranges electrodes at predetermined intervals less than valleys and ridges of a fingerprint.

The fingerprint scan sensor 220 may be implemented as a swipe type or an area type. In a swipe type fingerprint scan sensor, the user drags a position of a finger across the fingerprint scan sensor 220. The swipe type fingerprint scan sensor sequentially recognizes the finger (that is, a fingerprint) dragged across one dimensionally or linearly arranged sensor electrodes and then combines the recognized fingerprint sequences into a two-dimensional fingerprint image via processing. The area type fingerprint scan sensor acquires a two-dimensional fingerprint image when the user places a finger onto a two-dimensionally arranged sensor. In a touch sensor for recognizing a fingerprint, electrodes are arranged in one or two-dimensions.

In the electronic device 200 according to an embodiment of the present invention, the fingerprint scan sensor 220 may be installed in a lower end of the display unit 230, that is, on the home button 245, and a fingerprint recognition type may be a swipe type. However, the fingerprint scan sensor 220 may be randomly located at a position close to the display unit 230, the fingerprint recognition type may be an area type, and the fingerprint scan sensor 220 may be installed in a bezel area of the display unit 230 rather than on the home button 245. Further, when fingerprint scan sensor 220 is a touch sensor type fingerprint scan sensor, the fingerprint scan sensor 220 may be installed in a predetermined position of the input unit 240 located at a lower end of the display unit 230.

Figure 4A:
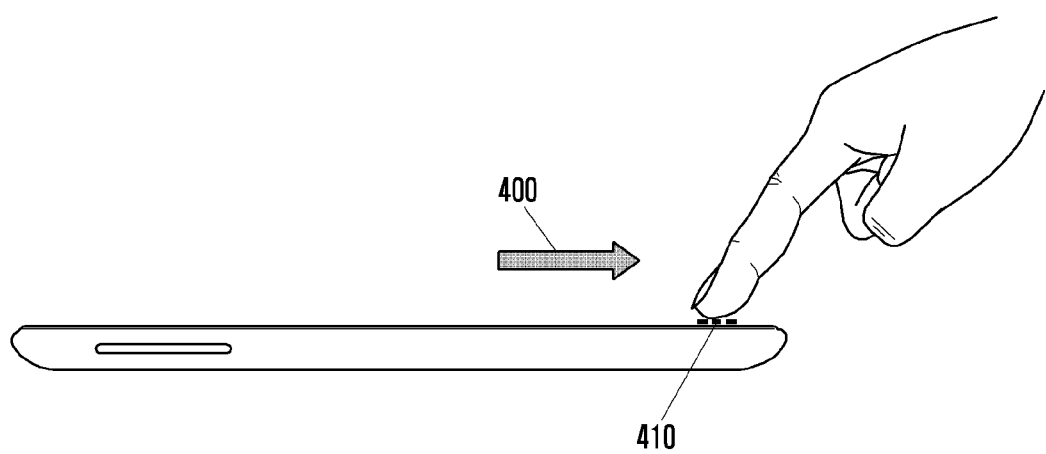
FIGS. 4A and 4B each illustrate a finger touch according to an embodiment of the present invention.
Figure 4B:
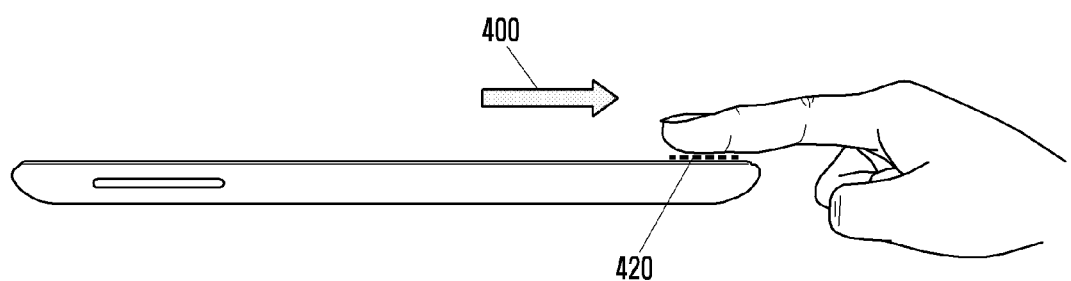
Figure 5A:
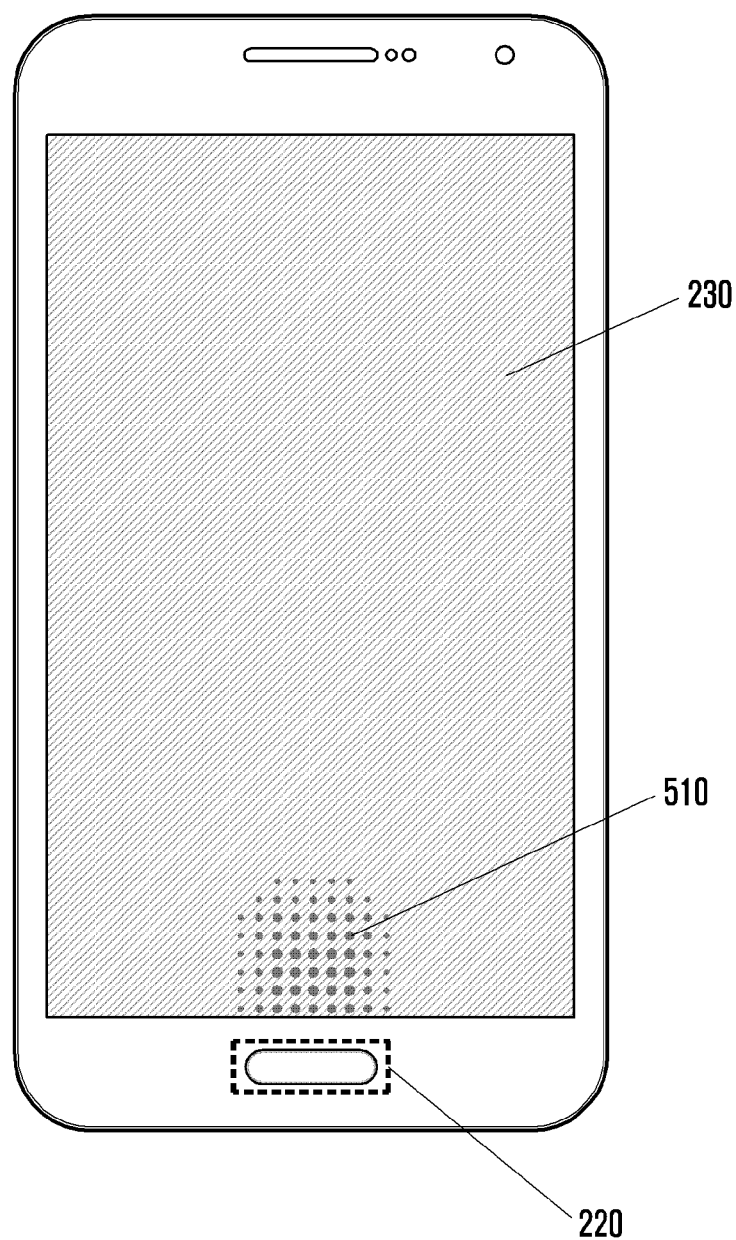
FIGS. 5A and 5B illustrate a method of increasing a fingerprint recognition rate of an electronic device according to an embodiment of the present invention.
Figure 5B:
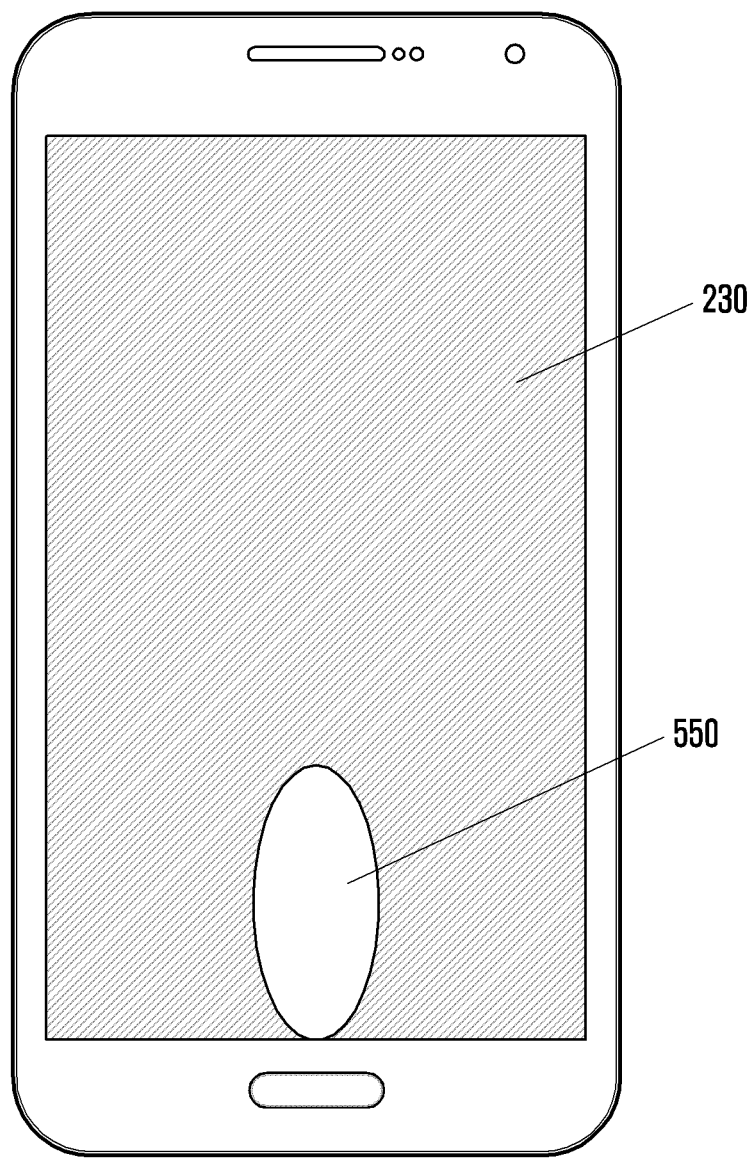

FIGS. 4A and 4B each illustrate a finger touch according to an embodiment of the present invention. FIG. 4A illustrates an example in which a fingerprint of a fingertip is scanned, and FIG. 4B illustrates an example in a which a fingerprint of a finger pad is scanned. When the finger is scanned to recognize the fingerprint, a recognition rate difference is generated between the case where the fingertip is scanned (for example, form top and bottom such as direction of the arrow 400) as illustrated in FIG. 4A and the case where the finger pad is scanned (for example, form top and bottom such as direction of the arrow 400) as illustrated in FIG. 4B. Since an area of the fingertip contacting the fingerprint scan sensor 220 is less than an area of the finger pad contacting the fingerprint scan sensor 220, the recognition rate of the fingertip is lower than that of the finger pad. However, many users may attempt to perform fingerprint recognition using the fingertip as illustrated in FIG. 4A. In fingerprint recognition, when the user is induced to perform a touch by using the finger as illustrated in FIG. 4B, the fingerprint recognition rate may be higher. FIGS. 5A and 5B illustrate a method of increasing a fingerprint recognition rate of the electronic device according to an embodiment of the present invention.

Referring to FIG. 5A, the controller 201 displays a guide area 510 to induce a finger touch in a fingerprint mode on the display unit 230. The guide area 510 has a size large enough to contain a whole finger pad, so as to induce the processing as illustrated in FIG. 4B. The guide area 510 may be set in an area of the display unit 230 close to the fingerprint scan sensor 220. The display unit 230 may be a touch screen integrally configured with the input unit 240. When the user touches the guide area 510 displayed on the display unit 230 in the fingerprint mode, the controller 201 detects a finger touch area in the guide area 510 via the input unit 240.

Referring to FIG. 5B, when the fingerprint mode is set, the controller 201 displays the guide area 5W on the display unit 230 as illustrated in FIG. 5A, and displays text data to induce the start of fingerprint recognition on the display unit 230. When the user touches the guide area 510 using a finger, the controller 201 analyzes a finger touch area detected by the input unit 240 to calculate a touched area 550. Then, the controller 201 compares the touched area with a preset reference area. When the touched area is less than the reference area, the controller 201 displays, on the display unit 230, text to induce the laying of the finger flatter in order to increase the touch recognition rate. When the touched area is greater than or equal to the reference area, the controller 201 displays text informing of the start of the fingerprint scan on the display unit 230.

When the fingerprint recognition process is performed, a message to induce the user to perform the fingerprint process may be text data. However, a text message may be displayed while an audio message or another type of display message (for example, lamp flickering) is provided. Hereinafter, the message is described as a text message.

Figure 6A:
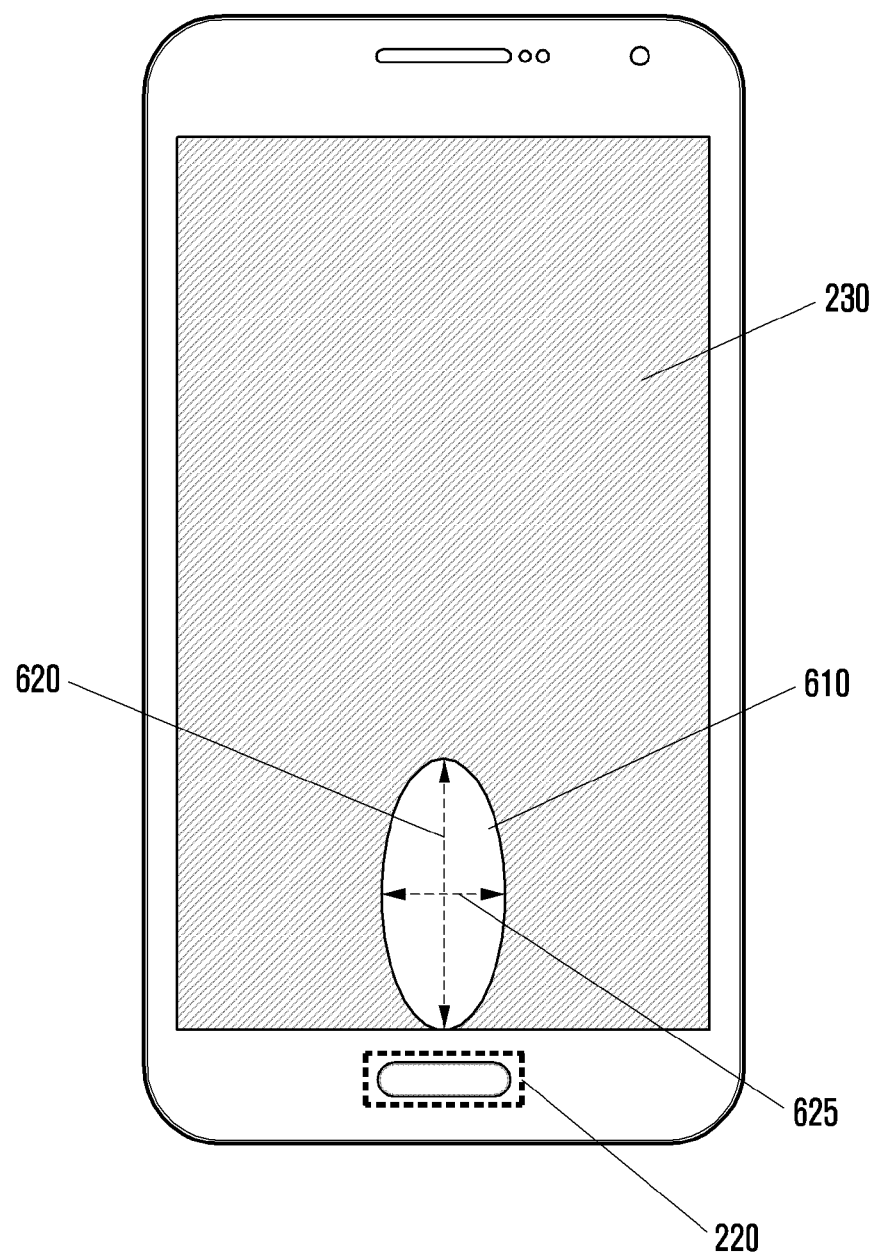
FIGS. 6A and 6B illustrate a method of increasing a fingerprint recognition rate of an electronic device according to an embodiment of the present invention.
Figure 6B:
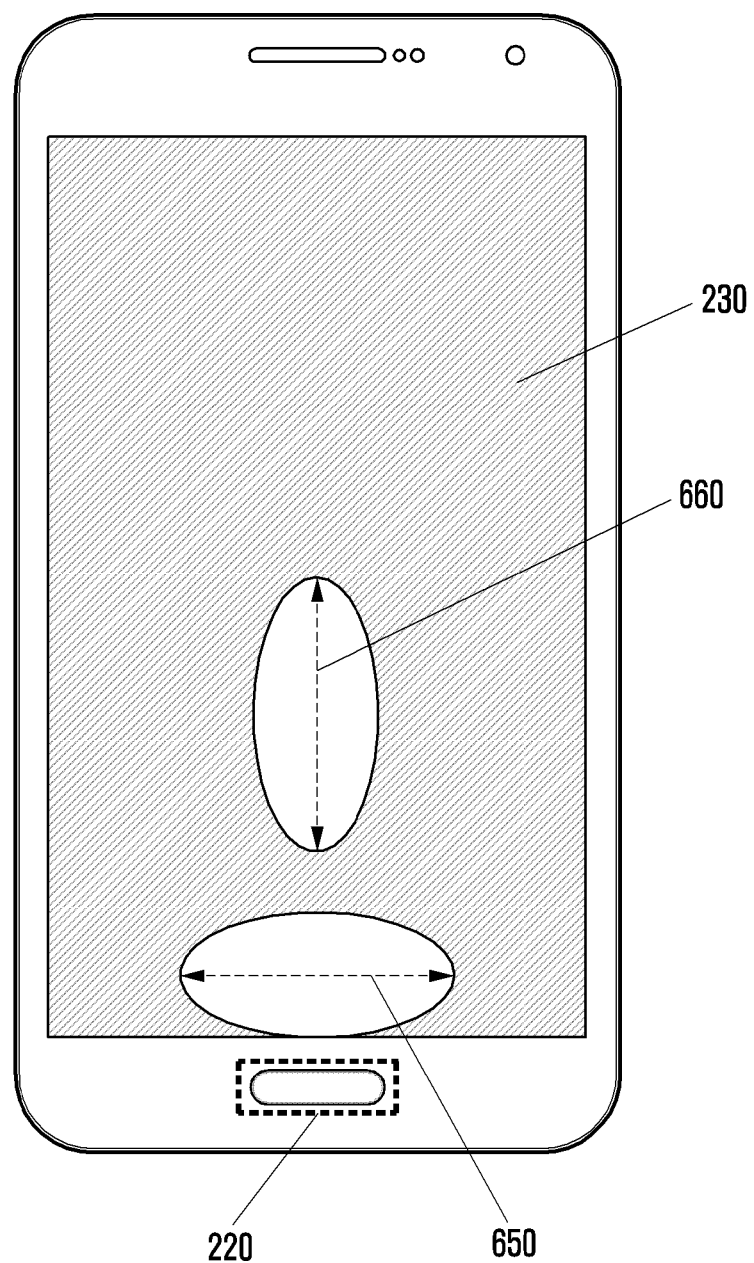

FIGS. 6A and 6B illustrate a method of increasing a fingerprint recognition rate of the electronic device 200 according to an embodiment of the present invention.

Referring to FIG. 6A, when the fingerprint mode is set, the controller 201 displays a guide area 510 on the display unit 230 as illustrated in FIG. 5A, and displays text data to induce the start of fingerprint recognition on the display unit 230. When the user touches the guide area 510 using a finger, the controller 201 analyzes a finger touch area 610 detected by the input unit 240. The finger touch area 610 may have a major axis 620 and a minor axis 625 according to a finger characteristic. When the major axis 620 of the touched area has a size greater than or equal to a preset value, it indicates that the finger is laid to achieve a high fingerprint recognition rate. The controller 201 calculates lengths of the major axis 620 and the minor axis 625 of the finger touch area 610, and then compares the length of the major axis of the finger touch area 610 with a preset length. When the length of the major axis 620 is less than the reference length, the controller 201 displays, on the display unit 230, text to induce the laying of the finger flatter in order to increase the touch recognition rate. When the length of the major axis 620 is greater than or equal to the reference length, the controller 201 displays text informing of the start of the fingerprint scan on the display unit 230.

Referring to FIG. 6B, when the fingerprint mode is set, the controller 201 displays the guide area 510 on the display unit 230 as illustrated in FIG. 5A, and displays text data to induce the start of fingerprint recognition on the display unit 230. When the user touches the guide area 510 using a finger, the controller analyzes a finger touch area detected by the input unit 240, calculates lengths of a major axis and a minor axis of the touched area, and then analyzes an orientation of the major axis of the touched area. A method of analyzing the orientation identifies an orientation of the major axis from the lengths of the two axes (e.g., major and minor axes). When the orientation of the major axis is different from that of the guide area 510 (for example, when the guide area 510 is vertically oriented as illustrated in FIG. 5A and the major axis 650 of the touched finger is horizontally oriented), the major axis 650 may exceed a scan ramie of the fingerprint scan sensor 220. When it is determined that the major axis 650 of the touched area exceeds the scan range of the fingerprint scan sensor 220, the controller 201 displays, on the display unit 230, text to induce a a finger touch in an opposite orientation in order to increase the touch recognition rate. When the orientation of the touched major axis 660 is the same as the orientation of the guide area 510, the controller 201 displays text informing of the start of the fingerprint scan on the display unit 230.

Then, when the user scans the finger via the fingerprint scan sensor 200 in a state where the text informing of the start of the fingerprint scan is displayed, the controller 201 recognizes information on the fingerprint scanned by the fingerprint scan sensor 220 and stores the recognized fingerprint information in the storage unit 210. When registering fingerprints, the electronic device 200 displays, on the display unit 230, the guide area 510 in which a finger pad can be scanned, induces the user to touch the finger pad when the user attempts to touch the finger in the guide area 510, and then induces a scan operation when the touch meets a preset touch condition.

The controller 201 induces a finger touch to increase the fingerprint recognition rate by analyzing a touched area in the guide area 510 as described above. A method of analyzing the touched area may use a touch area, lengths of a major axis and a minor axis of the touched area, and an orientation of the finger touch. In addition to the method independently using the touch area, the controller 201 may use the touch area, the major axis/minor axis of the touched area, and the finger orientation, the controller 201 may use a method using both the touched area and the finger orientation, a method of using both the major axis/minor axis of the touched area and the finger orientation, or a method of using all of the touched area, the major axis/minor axis of the touched area, and the finger orientation.

As described above, when registering the fingerprint, the controller 201 induces the user to put a finger on a Touch Screen Panel (TSP) before the fingerprint recognition. When the user's hand touches the TSP, the controller 201 determines a finger state by analyzing a touch event value (e.g., a touched area, a touch angle, a touch pressure, and/or a touch orientation). A value of an area becomes greater as a finger contacting the TSP moves toward a finger pad touch from a fingertip touch. The controller 201 determines whether the user uses the fingertip or the finger pad based on a major axis value and/or an area value. When the user uses the fingertip, the controller 201 displays a message instructing the user to lay the finger flatten. Further, when the orientation of the touched finger exceeds a scan area of the fingerprint scan sensor 220 as indicated by reference numeral 650 of FIG. 6B (for example, when the user makes a horizontal finger touch such that the touch exceeds a scan range of the fingerprint scan sensor 220 as illustrated in FIG. 6B), the controller 201 induces the user to change the finger orientation for the touch. When it is determined that one section of the finger touch is made based on the analysis of the touch event value, the controller 201 induces a scan operation by displaying text instructing to perform the scan in a direction in which the fingerprint scan sensor 220 is oriented (for example, downwards) for fingerprint recognition.

Figure 7:
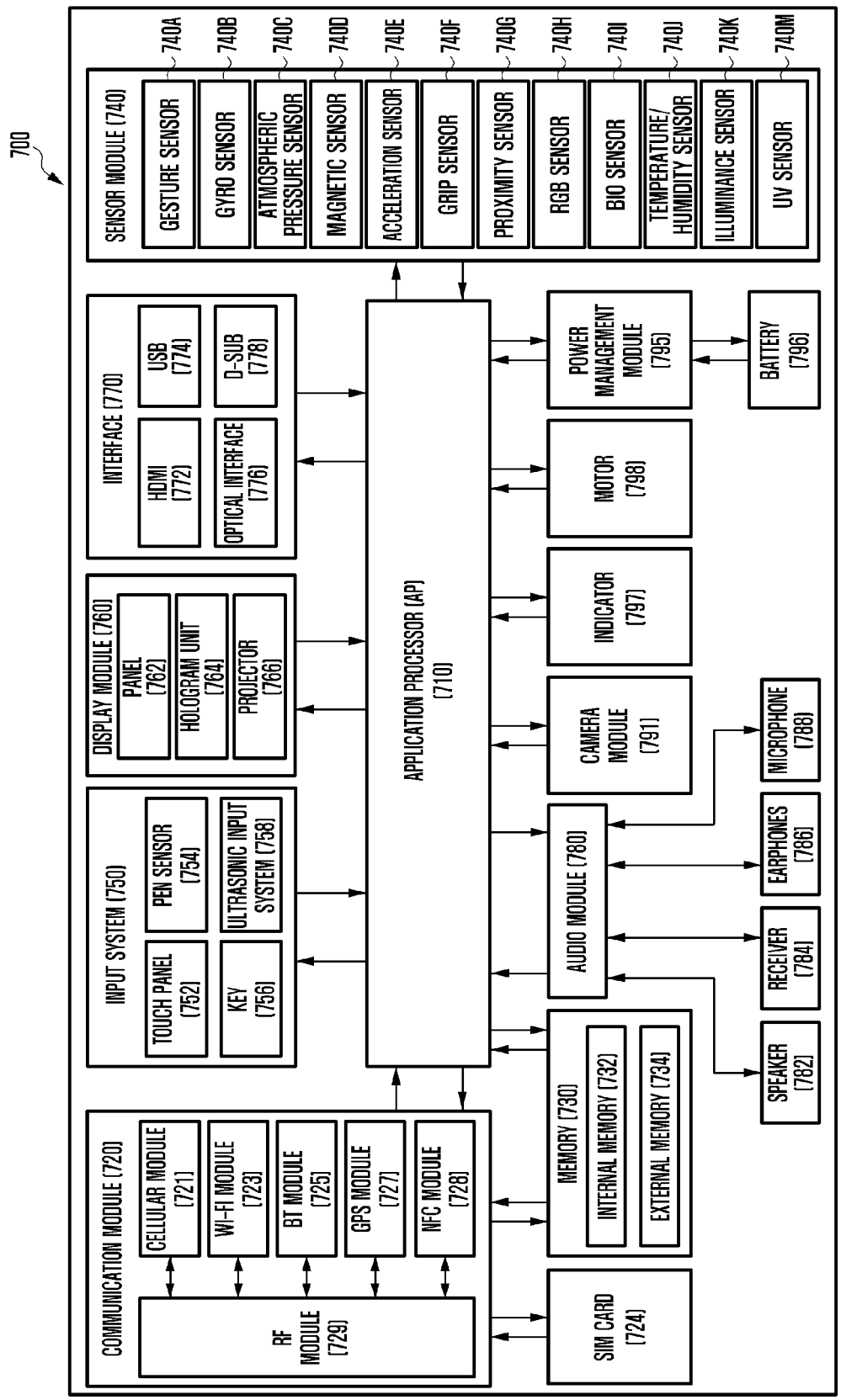
FIG. 7 is a block diagram of an electronic device according to an embodiment of the present invention.

FIG. 7 is a block diagram illustrating a configuration of an electronic device 700 according to an embodiment of the present invention. The electronic device 700 may be of the whole or a part of the electronic device 101.

Referring to FIG. 7, the electronic device 700 includes an Application Processor (AP) 710, a communication module 720, a Subscriber Identity Module (SIM) card 724, a memory 730, a sensor module 740, an input system 750, a display module 760, an interface 770, an audio module 780, a camera module 791, a power management module 795, a battery 796, an indicator 797, and a motor 798.

The AP 710 operates an Operating System (OS) and/or application programs to control a plurality of hardware and/or software components connected to the AP 710 and performs data-processing and operations on multimedia data. For example, the AP 710 may be implemented in the form of a System on Chip (SoC). According to an embodiment, the AP 710 includes a Graphics Processing Unit (GPU).

The communication module 720 (e.g. communication interface 160) performs data communication with other electronic devices (e.g. external electronic device 104 and server 106) via a network. According to an embodiment of the present invention, the communication module 720 includes a cellular module 721, a Wi-Fi module 723, a BT module 725, a UPS module 727, an NFC module 728, and a Radio Frequency (RF) module 729.

The cellular module 721 is responsible for voice and video communication, text messaging, and Internet access services via a communication network (e.g. LTE, LTE-A, CDMA, WCDMA, UMTS, WiBro, and GSM networks). The cellular module 721 performs identification and authentication of electronic devices in the communication network using the SIM card 724. According to an embodiment of the present invention, the cellular module 721 performs at least one of the functions of the AP 710. For example, the cellular module 721 may perform at least a part of the multimedia control function.

According to an embodiment of the present invention, the cellular module 721 includes a Communication Processor (CP). The cellular module 721 may be implemented in the form of an SOC. Although the cellular module 721 (e.g. communication processor), the memory 730, and the power management module 795 are depicted as independent components separated from the AP 710, the present invention is not limited thereto but may be embodied in a way that the AP 710 includes at least one of the components (e.g. cellular module 721).

According to an embodiment of the present invention, each of the AP 710 and the cellular module 721 (e.g. communication processor) loads a command or data received from at least one of the components on a non-volatile or volatile memory and processes the command or data. The AP 710 or the cellular module 721 stores data received from other components or generated by at least one of the other components in the non-volatile memory.

Each of the Wi-Fi module 723, the ET module 725, the OPS module 727, and the NEC module 728 includes a processor for processing data it transmits/receives. Although the cellular module 721, the Wi-Fi module 723, the BT module 725, the GPS module 727, and the NEC module 728 are depicted as independent blocks, at least two of them (e.g. the communication processor corresponding to the cellular module 721 and the Wi-Fi processor corresponding to the Wi-Fi module 723) may be integrated in the form of an SoC.

The RE module 729 is responsible for data communication, e.g. transmitting/receiving RE signals. The RF module 729 includes a transceiver, a Power Amp Module (PAM), a frequency filter, and a Low Noise Amplifier (LNA). The RF module 729 also includes elements for transmitting/receiving electrical waves in free space, e.g. a conductor or a conductive wire. Although FIG. 7 is directed to the case where the Wi-Fi module 723, the ST module 725, the GPS module 727, and the NFC module 728 share the RF module 729, the present invention is not limited thereto but may be embodied in a way that at least one of the Wi-Fi module 723, the ST module 725, the GPS module 727, and the NFC module 728 transmits/receives RF signals via an independent RF module.

The SIM card 724 is inserted into a slot formed at a predetermined position of the electronic device 700. The SIM card 724 stores unique identity information (e.g. Integrated Circuit Card Identifier (ICCID)) or subscriber information (e.g. International Mobile Subscriber Identity (IMSI)).

The memory 730 (e.g. memory 130) includes at least one of an internal memory 732 and an external memory 734. The internal memory 732 includes at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask RUM, flash ROM, NAND flash memory, and NOR flash memory).

According to an embodiment of the present invention, the internal memory 732 is a Solid State Drive (SSD). The external memory 734 may be a flash drive such as a Compact Flash (CF), a Secure Digital (SD), micro-SD, a Mini-SD, an extreme Digital (xD), and a Memory Stick. The external memory 734 may be connected to the electronic device 700 via various interfaces. According to an embodiment of the present invention, the electronic device 700 includes a storage device (or storage medium) such as a hard drive.

The sensor module 740 measures a physical quantity or checks the operation status of the electronic device 700 and converts the measured or checked information to an electrical signal. The sensor module 740 includes at least one of a gesture sensor 740A, a Gyro sensor 740B, atmospheric pressure sensor 740C, a magnetic sensor 740D, an acceleration sensor 740E, a grip sensor 740F, a proximity sensor 740G, a color sensor 740H (e.g. Red, Green, Blue (RGB) sensor), a biometric sensor 740I, a temperature/humidity sensor 740J, an illuminance sensor 740K, and an Ultra Violet (UV) light sensor 740M.

The biometric sensor 740I is a fingerprint scan sensor for fingerprint recognition and is a sensor which can scan a user's finger. The fingerprint scan sensor may have a configuration in an optical type or a semiconductor type. Further, the fingerprint scan sensor 220 may be configured in a touch sensor type. The fingerprint scan sensor may be implemented in a swipe type or an area type.

Additionally or alternatively, the sensor module 740 may include an E-nose sensor, an Electromyography (EMG) sensor, Electroencephalogram (EEG) sensor, an Electrocardiogram (ECG) sensor, an Infrared (IR) sensor, an iris sensor, and a fingerprint sensor. The sensor module 1240 further includes a control circuit for controlling at least one of the sensors included therein.

The input system 750 includes a touch panel 752, a (digital) pen sensor 754, a key 756, and an ultrasonic input system 758. The touch panel 752 may be one of a capacitive, a resistive, an infrared, or a microwave type touch panel. The touch panel 752 includes a control circuit. In the case of the capacitive type touch panel, it is possible to detect physical contact or the approximation, or proximity, of a touch. The touch panel 752 may further include a tactile layer. In this case, the touch panel 752 provides the user with a haptic reaction.

The (digital) pen sensor 754 may be implemented with a sheet with the same or similar way to process a touch input of the user or a separate recognition sheet. The key 756 may include physical buttons, an optical key, and a keypad. The ultrasonic input system 758 is a device capable of checking data by detecting sound waves via a microphone 788 and may be implemented for wireless recognition. According to an embodiment of the present invention, the electronic device 700 receives the user input made by means of an external device (e.g. computer or server) connected via the communication module 720.

The display module 760 (e.g. display module 150) includes a panel 762, a hologram unit 764, and a projector 766. The panel 762 may be a Liquid Crystal Display (LCD) panel or an Active Matrix Organic Light Emitting Diodes (AMOLED) panel. The panel 762 may be implemented so as to be flexible, transparent, and/or wearable. The panel 762 may be implemented as a module integrated with the touch panel 752. The hologram unit 764 presents 3-dimensional images in the air using the interference of light. The projector 766 projects an image onto a screen. The screen may be placed inside or outside of the electronic device 700. According to an embodiment of the present invention, the display 760 includes a control circuit for controlling the panel 762, the hologram unit 764, and the projector 766.

The interface 770 includes a High-Definition Multimedia Interface (HDMI) 772, a Universal Serial Bus (USB) 774, an optical interface 776, and a D-subminiature (D-sub) connector 778. The interface 770 may include the communication interface 160 as shown in FIG. 1. Additionally or alternatively, the interface 770 may include a Mobile High-definition Link (MHL) interface, a SD/MultiMedia Card (MMC) card interface, and Infrared Data Association (IrDA) standard interface.

The audio module 780 converts sound to an electrical signal and vice versa. At least a part of the audio module 780 may be included in the input/output interface 140 as shown in FIG. 1. The audio module 780 processes an audio information input or output via a speaker 782, a receiver 784, earphones 786, and a microphone 788.

The camera module 791 is a device capable of taking still and motion pictures and, according to an embodiment of the present invention, includes at least one image sensor (e.g., front and rear sensors), a lens, and an Image Signal Processor (ISP), and a flash (e.g., LED or xenon lamp).

The power management module 795 manages the power of the electronic device 700. The power management module 795 includes a Power Management Integrated Circuit (PMIC), a charger Integrated Circuit (IC), a battery, a battery, or a fuel gauge.

The PMIC may be integrated into an integrated circuit or an SoC semiconductor. Charging may be classified into wireless charging and wired charge. The charger IC charges the battery and protects the charger against overvoltage oar overcurrent. According to an embodiment of the present invention, the charger IC includes at least one of wired charger and wireless charger ICs. Examples of wireless charging technology include resonance wireless charging and electromagnetic wave wireless charging, where wireless charging requires an extra circuit such as a coil loop, a resonance circuit, and a diode.

The battery gauge measures the residual power of the battery 796, a charging voltage, a current, and a temperature. The battery 796 stores or generates power and supplies the stored or generated power to the electronic device 700. The battery 796 may include a rechargeable battery or a solar battery.

The indicator 797 displays the operation status of the electronic device 700 or a part of the electronic device 700, booting status, messaging status, and charging status. The motor 798 converts an electronic signal to a mechanical vibration. The electronic device 700 may include a processing unit (e.g. a GPU) for supporting mobile TV. The processing unit for supporting mobile TV may be able to process media data abiding by a broadcast standard such as Digital Multimedia Broadcasting (DMB), Digital Video Broadcasting (DVB), and media flow.

As described above, the electronic device 700 of the present invention is capable of providing diverse screen displays in adaptation to various conditions to implement an optimal environment for utilizing the electronic device 700, resulting in improvement of user convenience. Also, the electronic device 700 of the present invention is advantageous in terms of facilitating navigation between folders by sorting the folders by hierarchical level.

The above enumerated components of the electronic device 700 of the present invention may be implemented into one or more parts, and the names of the corresponding components may be changed depending on the kind of electronic device. The electronic device 700 of the present invention may include at least one of the aforementioned components with omission or addition of some components. The components of the electronic device 700 of the present invention may be combined selectively into an entity to perform the functions of the components equally as before the combination.

The electronic device 700 according to an embodiment of the present invention includes a display unit for displaying a guide area corresponding to a finger touch in at least some areas thereof in a fingerprint mode, an input unit for detecting a touch input, a fingerprint scan sensor located at an area adjacent to the guide area of the display unit, and a controller for providing guide information related to fingerprint recognition based on the touch detected through the guide area in the fingerprint mode.

The controller determines at least one attribute related to the touch, display information making a request for changing the touch when at least one attribute does not meet a predetermined condition, and collects information on a fingerprint corresponding to the touch via a fingerprint scan sensor adjacent to the guide area when at least one attribute does not meet the predetermined condition.

At least one attribute includes at least one of a touched area related to the touch, a touch angle, and a touch pressure.

The fingerprint scan sensor may be mounted to the home button.

The controller compares the touched area with a preset area. When the touched area is less than the preset touched area, the controller displays text instructing the user to touch a greater area of the guide area on the display unit with a finger.

The controller extracts sizes of a major axis and a minor axis of the touched finger, compares the extracted sizes of the major axis and the minor axis, and displays text to induce the user to touch a greater area of the guide area with a finger when the size of the major axis is less than a preset size.

The controller analyzes an orientation of the touched finger. When the orientation of the finger corresponds to an inverse orientation, the controller displays text to induce the user to touch the guide area with the finger in a forward orientation The controller compares the touched area and the preset area, analyzes an orientation of the touched finger, displays text to induce the user to touch a greater area of the guide area with a finger when the touched area is less than a preset area, and displays text to induce the user to perform the finger touch in a forward orientation when the finger touch is made in a backward orientation.

The controller registers fingerprint information, processes a fingerprint input mode, displays a guide area on a display unit in the fingerprint input mode, recognizes a fingerprint scanned by a fingerprint scan sensor, compares the scanned fingerprint with a registered fingerprint, and performs a preset function when the scanned fingerprint matches the registered fingerprint.

The fingerprint input mode is a mode which releases a lock screen, where the controller releases the lock on the screen when the recognized fingerprint in the fingerprint input mode matches the registered fingerprint.

According to an embodiment of the present invention, the electronic device 700 displays the guide area in at least some areas of the display unit 230 which are close to the fingerprint scan sensor 220 in the fingerprint mode. According to an embodiment of the present invention, the guide area is used for improving a fingerprint recognition rate according to a finger touch by the user. That is, when the fingerprint is scanned, the electronic device displays the guide area to induce the user to perform the scan with a finger pad rather than a fingertip. For example, the fingerprint scan sensor 220 may be located right below the fingerprint input guide area of the touch screen. When the user puts a finger on the touch screen for finger recognition, the fingerprint scan sensor 220 induces the generation of a touch event via the contact between a fingerprint part and the touch screen. The electronic device 700 having the fingerprint scan sensor provides a guide such that the fingerprint part touches enough of the touch screen to increase the fingerprint recognition rate prior to fingerprint recognition.

Figure 8:
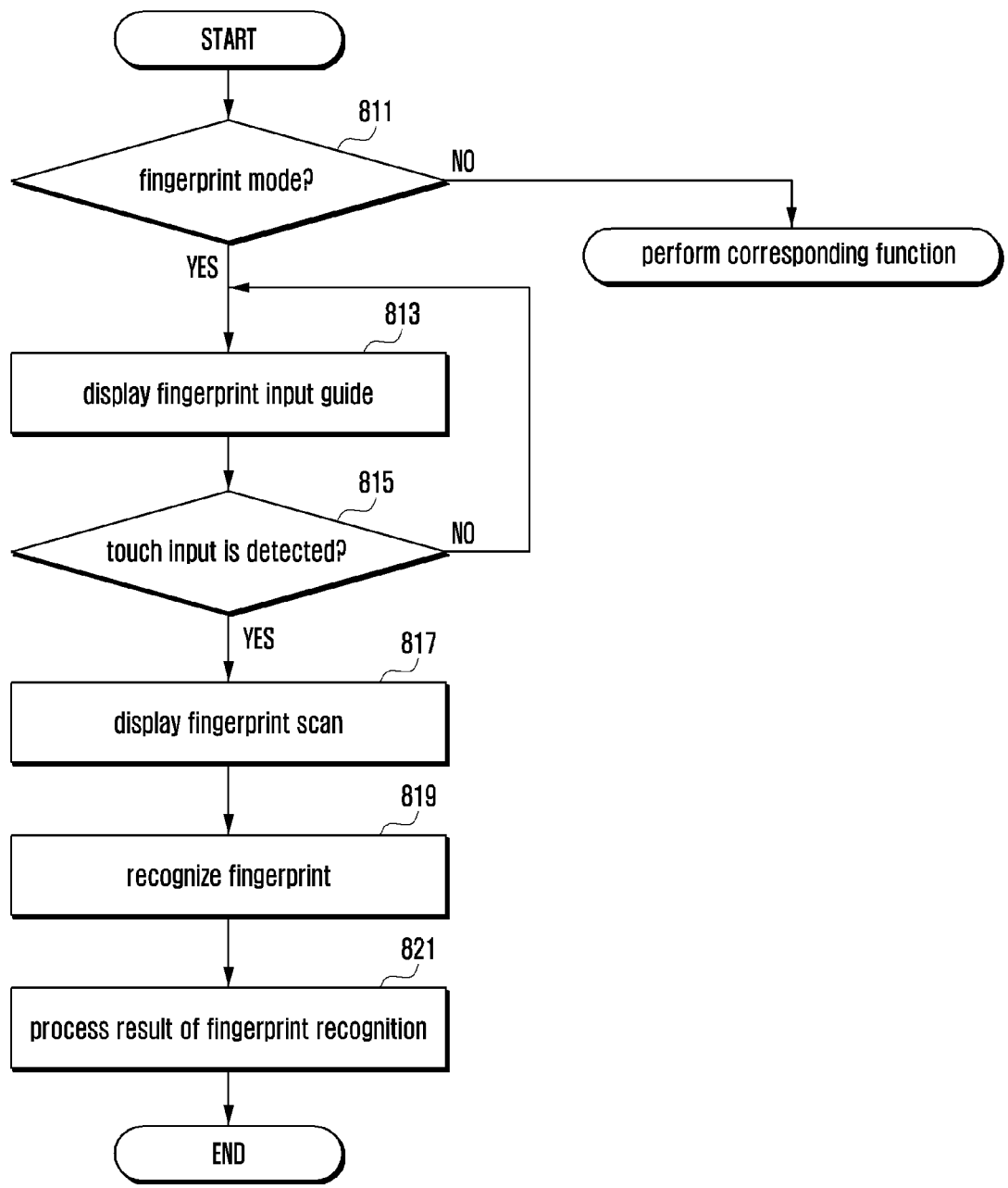
FIG. 8 is a flowchart of a method of a fingerprint mode in an electronic device according to an embodiment of the present invention.

FIG. 8 is a flowchart of a method of a fingerprint mode in an electronic device according to an embodiment of the present invention. The fingerprint mode includes a fingerprint registration mode and a fingerprint input mode. The fingerprint registration mode is a mode in which a fingerprint is recognized and registered in the storage unit 210, and the fingerprint input mode is a mode in which recognized fingerprint information is compared with registered fingerprint information and a preset function is performed when the information matches each other.

Referring to FIG. 8, when the fingerprint mode is requested in step 811, the electronic device (for example, the controller 201) detects the request. In step 813, the controller 201 displays a fingerprint input guide in an area of the display unit 230 close to the fingerprint scan sensor 220. In step 815, the controller 201 detects a user's touch input. In step 817, the controller 201 displays data to induce a fingerprint scan on the display unit 230. When the scan is detected in step 819, the controller 201 recognizes the fingerprint detected by the fingerprint scan sensor 220. In step 821, the controller 201 processes the recognized fingerprint information.

When the fingerprint mode is the fingerprint registration mode, the controller 201 induces the fingerprint scan such that the user touches enough of the touch screen using a fingerprint part. When a fingerprint scan operation is performed, the controller 201 stores the recognized fingerprint information in the storage unit 210 in step 821. Further, when the fingerprint mode is the fingerprint input mode, the controller 201 displays the fingerprint input guide on the touch screen, and releases a lock screen of the device by comparing the recognized fingerprint information with the registered fingerprint information in step 821.

Figure 9:
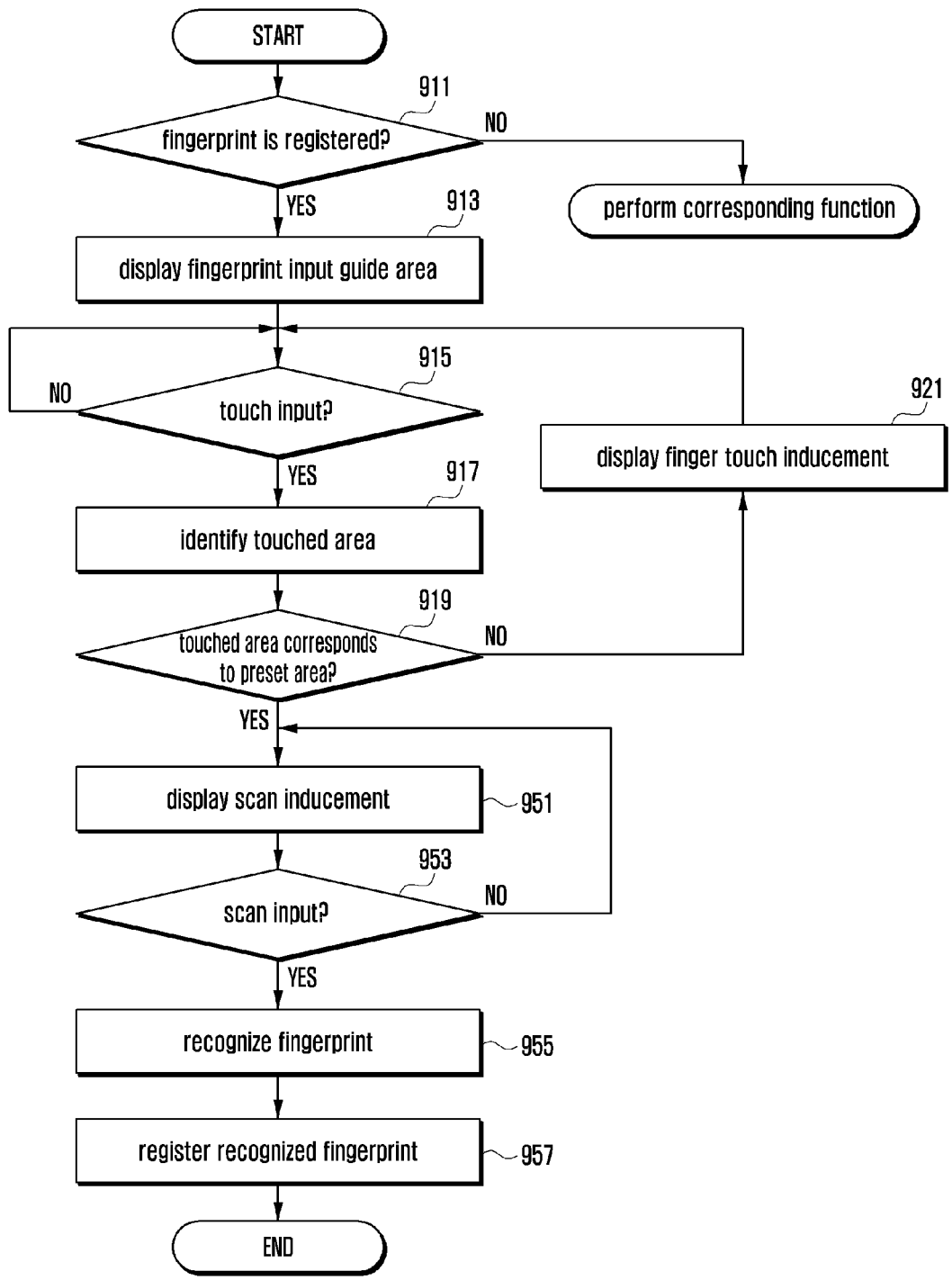
FIG. 9 is a flowchart of a method of recognizing and registering a fingerprint while inducing a user to perform a finger touch having a predetermined touch size in an electronic device according to an embodiment of the present invention.
Figure 10A:
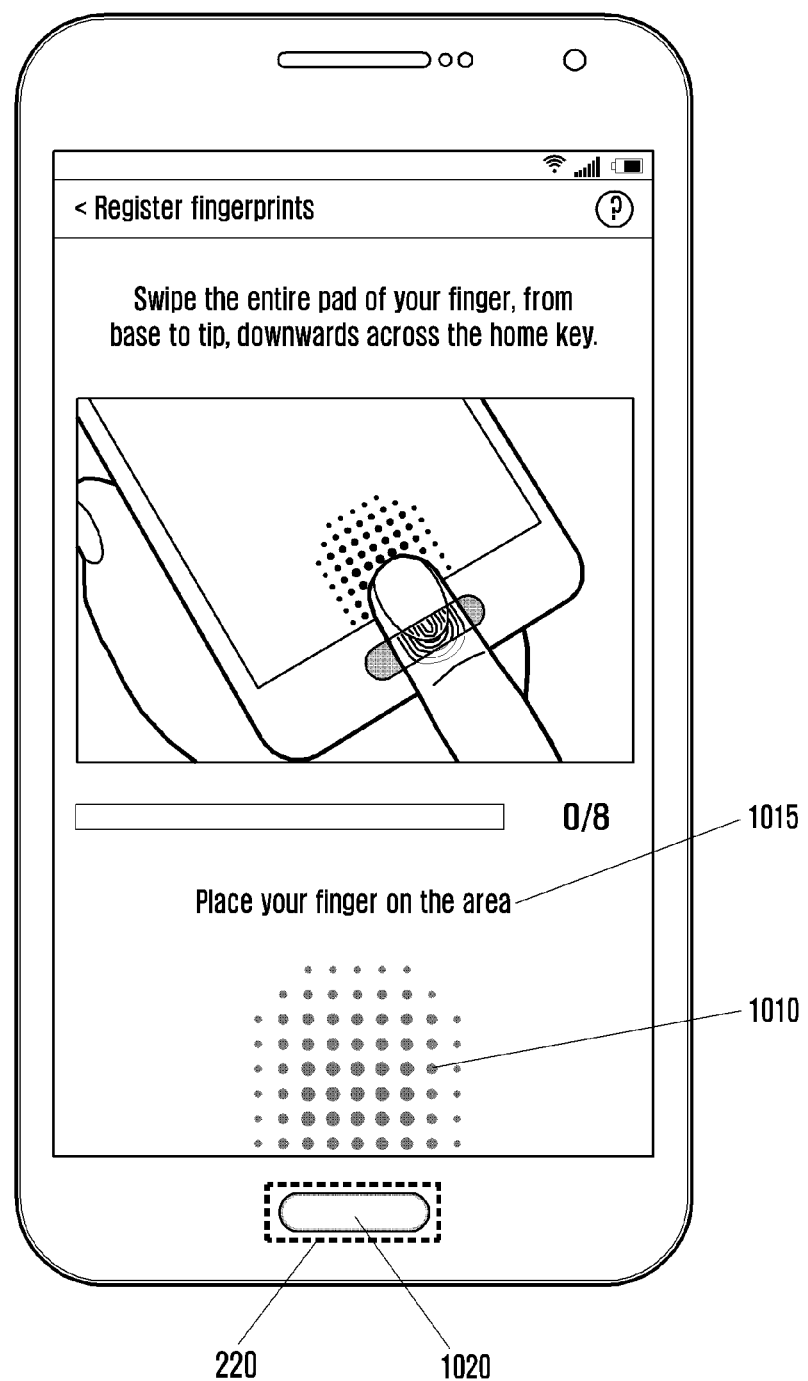
FIGS. 10A to 10C illustrate an operation in which an electronic device registers a fingerprint according to an embodiment of the present invention.
Figure 10B:
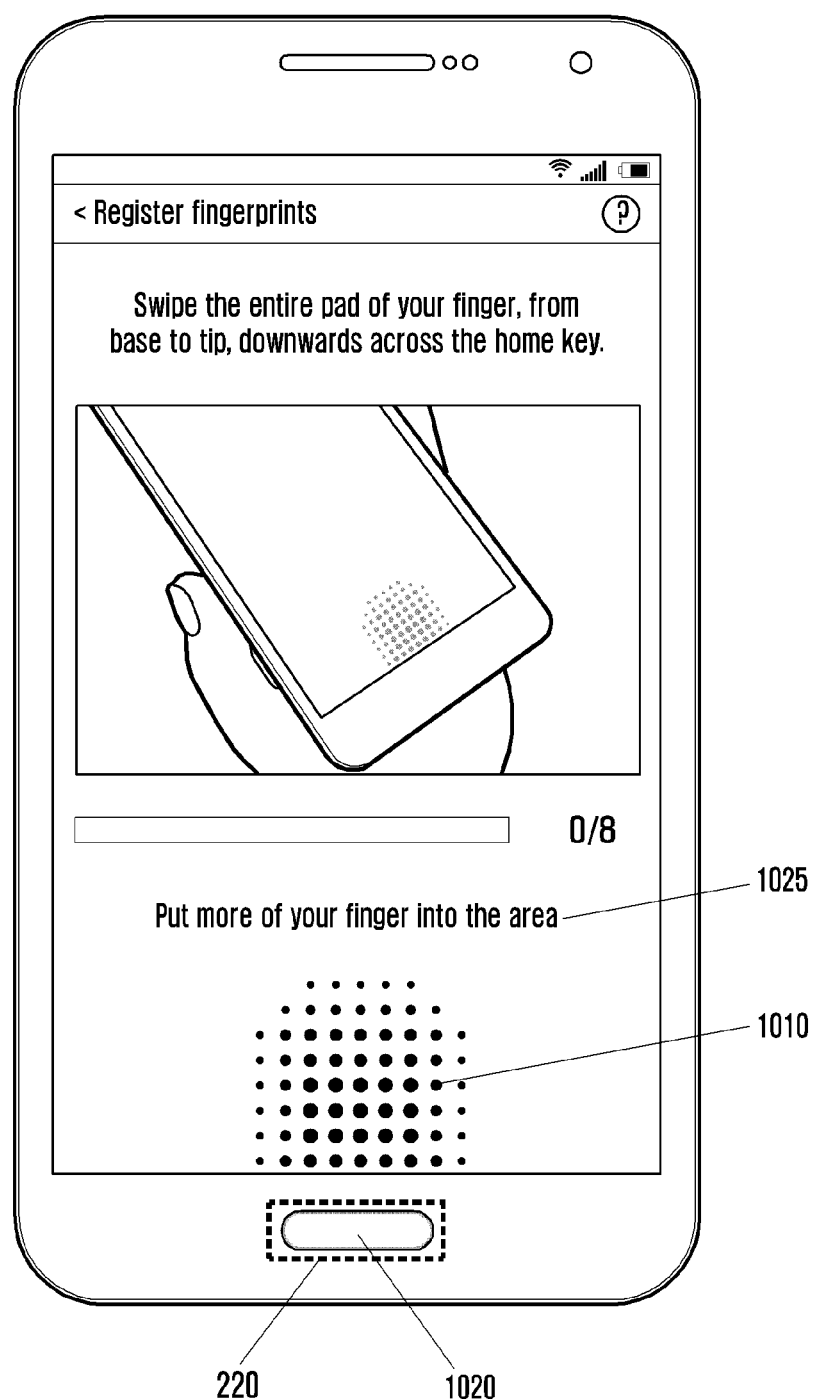
Figure 10C:
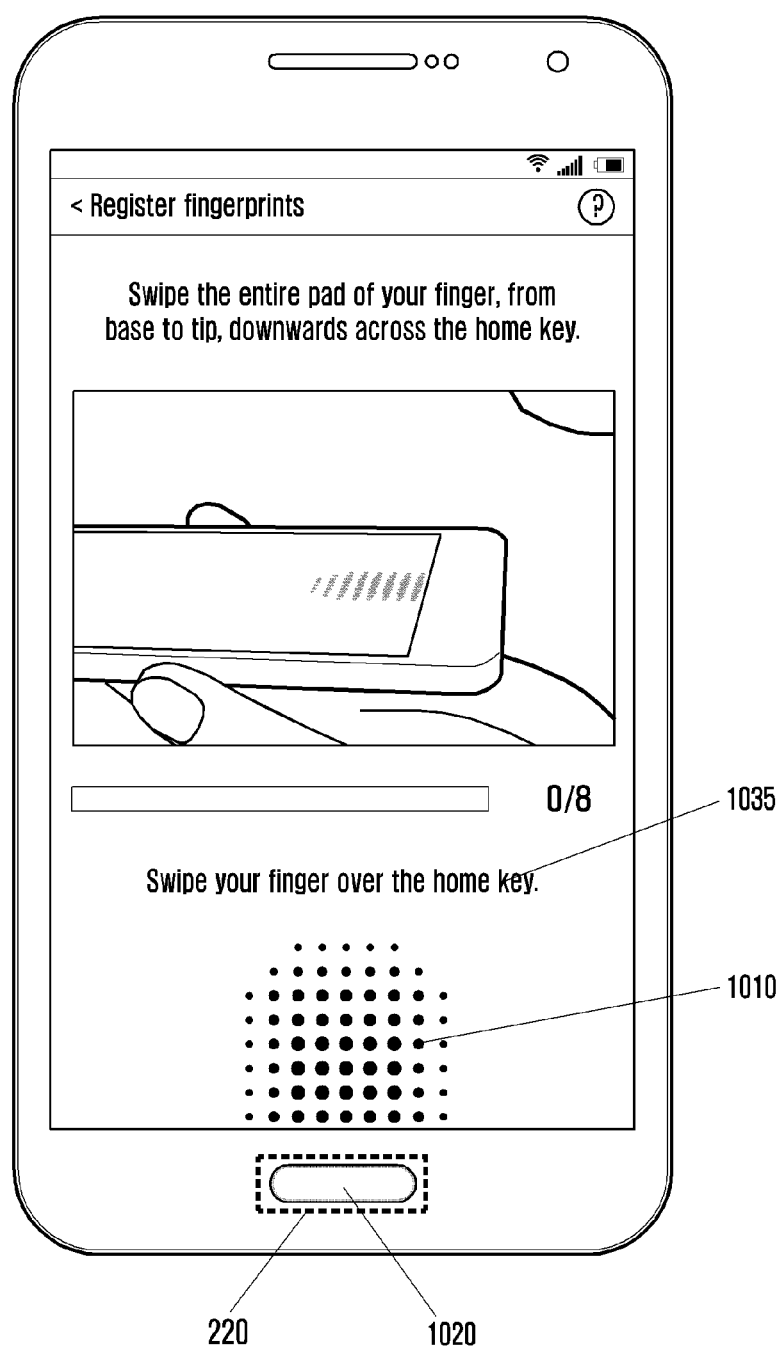

FIG. 9 is a flowchart of a method of recognizing and registering a fingerprint while inducing a user to perform a finger touch having a predetermined touch size in an electronic device according to an embodiment of the present invention. FIGS. 10A to 10C illustrate an operation in which an electronic device registers a fingerprint according to an embodiment of the present invention.

Referring to FIG. 9 and FIGS. 10A to 10C, a fingerprint registration mode is set in a setting mode. For example, when the fingerprint registration mode is set in the setting mode, the controller 201 detects the fingerprint registration in step 911. The controller 201 displays a fingerprint guide area 1010 in step 913 as illustrated in FIG. 10A. The fingerprint input guide area 1010 may be configured on the display unit 230 close to the fingerprint scan sensor 220, and the fingerprint input guide area 1010 has a size sufficient to contain one entire section of a finger. Further, when the fingerprint input guide area 1010 is displayed, the controller 201 displays text data 1015 to induce the user to touch the fingerprint input guide area 1010 with a whole finger pad in step 913. For example, the text data may be "Place your finger on the area."

As described above, when the user touches the fingerprint input guide area 1010 in a state where the fingerprint input guide area 1010 and the text data to induce the touch are displayed, the controller 201 detects the touch via the input unit 240 in step 915. The controller 201 identifies a touch area in the guide area 1010 in step 917. The controller 201 compares the identified touched area with a preset touched area in step 919. When the identified touched area is less than the preset touched area, the controller 201 displays, on the display unit 230, data to induce a greater finger touch area in step 921 as illustrated in FIG. 10B. By scanning one whole section of the finger in the fingerprint registration, the fingerprint recognition rate can be increased. However, as illustrated in FIG. 4A, using fingerprint information scanned by just the fingertip, the fingerprint recognition rate may decrease. When the touch is detected as illustrated in FIG. 4A, the controller 201 displays data to induce enough of a finger touch (for example, a touch made by one whole section of the finger) in step 921 as illustrated in FIG. 4B and waits for a touch input. Data 1025 to induce a re-touch may be "Put more of your finger into the area" as illustrated in FIG. 10B.

When it is identified that the finger touched area is greater than or equal to the preset touched area in a state where the fingerprint input guide area 1010 is displayed, the controller 201 detects it in step 919. The controller 201 displays, on the display unit 230, data inducing a fingerprint scan as illustrated in FIG. 10C. That is, when a sufficient finger touch input is recognized in the fingerprint input guide area 1010, the controller 201 displays, on the display unit 230 text data 1035 to induce a fingerprint scan. When the fingerprint scan sensor 220 is installed in a home key 1020 and a scan type is a swipe type, the text data 1035 to induce the fingerprint scan may be "Swipe your finger over the home key" as illustrated in FIG. 10C.

When the user identifies the inducement data and performs a swiping action in a direction of the fingerprint scan sensor 220 with the finger, the controller 201 detects the swipe action in step 953. The controller 201 recognizes fingerprint information detected by the fingerprint scan sensor 220 in step 955. Then, the controller 201 stores the recognized fingerprint information in the storage unit 210 in step 957.

In the fingerprint registration mode, the controller 201 induces the user to touch the touch screen with enough of a whole finger pad as illustrated in FIG. 4B before the user scans the fingerprint. Then, when the finger touch having a preset touched area is identified, the controller 201 induces the scan and recognizes the scanned fingerprint. Accordingly, an entire area of the fingerprint of the user can be scanned, thereby increasing the fingerprint recognition rate.

FIG. 9 illustrates analyzing a finger touched area and inducing a scan in fingerprint registration. However, a touch determination condition may consider a length (e.g. major axis/minor axis) of the touched area and/or to finger touch direction (e.g. angle) as well as the touched area. When the finger touch is made while the finger is placed, the touch orientation may be defined by angles of a major axis and a minor axis configured according to a direction of a finger section. In the following description, the touch direction may be used similarly as a touch angle. Further, when the length of the major axis is greater than a preset length, it indicates that a fingerprint part sufficiently touches the touch screen. That is, when the length of the major axis of the touched area is greater than the preset length, it indicates that the touched area is greater than or equal to a preset area in FIG. 9. Further, the finger touch direction may be induced to touch the scan area of the fingerprint scan sensor 220 in a forward direction. A method of determining the finger touch direction identifies a direction in which the major axis orients from the lengths of the two axes (e.g. major and minor axes). When the orientation of the major axis is different from that of the guide area 510 (for example, the guide area is vertically configured and the major axis of the touched finger is horizontally configured), the finger may exceed a scan range of the fingerprint scan sensor 220. When it is determined that the major axis of the touched area exceeds the scan range of the fingerprint scan sensor 220, the controller 201 displays, on the display unit 230, text to induce the user to change the orientation of the finger touch (for example, vertical finger touch) in order to increase the touch recognition rate.

The touch determination conditions for the fingerprint scan include a touched area, lengths of a major axis/minor axis of the touched area and orientations of the touched area. The fingerprint recognition operation may be induced or controlled based on one of the conditions. The fingerprint recognition operation may be induced and controlled by selecting two of the determination conditions (for example, the touched area and the orientations of the touched area or the lengths and the orientations of the major axis/minor axis) or selecting all three conditions.

FIG. 11 is a flowchart of a fingerprint recognition method via an inducement of a finger touch while analyzing a finger touch orientation and a major axis/minor axis of the touched area in an electronic device according to art embodiment of the present invention.

Referring to FIG. 11, when a fingerprint registration mode is set in the setting mode, the controller 201 detects the fingerprint registration in step 1111. The controller 201 displays a fingerprint input guide area on the display unit 230 in step 1113. The fingerprint input guide area 1010 may be configured in an area of the display unit 230 near the fingerprint scan sensor 220. The fingerprint input guide area 1010 is sufficiently large to contain a whole fingerprint. Further, when the fingerprint input guide area 1010 is displayed, the controller 201 displays text data to induce the user to touch the fingerprint input guide area 1010 with a whole finger pad in step 1113.

When the user touches the fingerprint input guide area 1010, the controller 201 detects the touch via the input unit 240 in step 1115. The controller 201 identifies an orientation of the touched finger in step 1117. When an orientation of a major axis of the finger matches the fingerprint input guide area 1010, the touch is determined as a forward touch. When the orientation of the major axis of the finger does not match the fingerprint input guide area 1010, the touch is determined as a backward touch. When the finger touch is not the forward touch, the controller 201 detects it in step 1119. The controller 201 displays a text message to induce the user to perform the forward finger touch on the display unit 230 in step 1121. Then, the controller 201 returns to step 1115. In this case, the user identifies text data (for example, text data to induce a change in the touch orientation) displayed on the display unit 230. The user then changes the finger orientation and touches the guide area.

When the forward finger touch is detected in step 1119, the controller 201 identifies lengths of the major axis/minor axis of the touched area in step 1123. The controller 201 identifies whether the length of the major axis is greater than or equal to a preset size. When the length of the major axis is less than a preset size, the controller 201 displays text data to induce the finger to be laid flatter in step 1127. The controller 201 then returns to step 1115.

However, when the length of the major axis of the touched area is greater than or equal to the preset size in step 1125, the controller 201 displays data to induce a fingerprint scan on the display unit 230 in step 1151. For example, when a sufficiently large fingerprint touch input is detected in the fingerprint input guide area 1010, the controller 201 displays text data to induce the fingerprint scan on the display unit 230. When the user identifies the inducement data and performs a swipe action in a direction of the fingerprint scan sensor 220 with the finger, the controller 201 detects the swipe action in step 1153. The controller 201 recognizes fingerprint information detected by the fingerprint scan sensor 220 in step 1155. Then, the controller 201 registers the recognized fingerprint information in the storage unit 210 in step 1157.

Figure 13A:
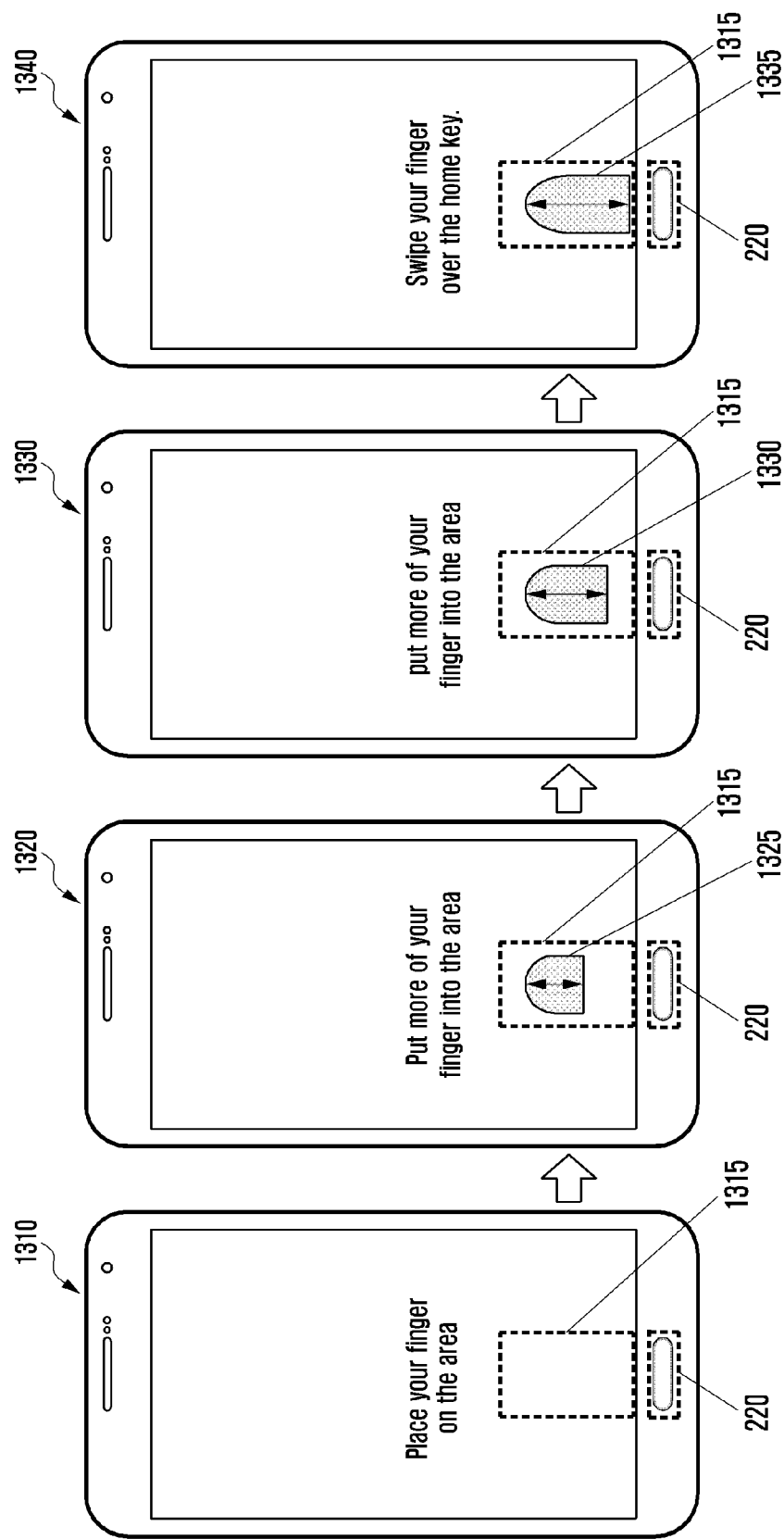
FIGS. 13A to 13B each illustrate text data displayed on a display unit when an electronic device performs a fingerprint recognition method according to an embodiment of the present invention.
Figure 13B:
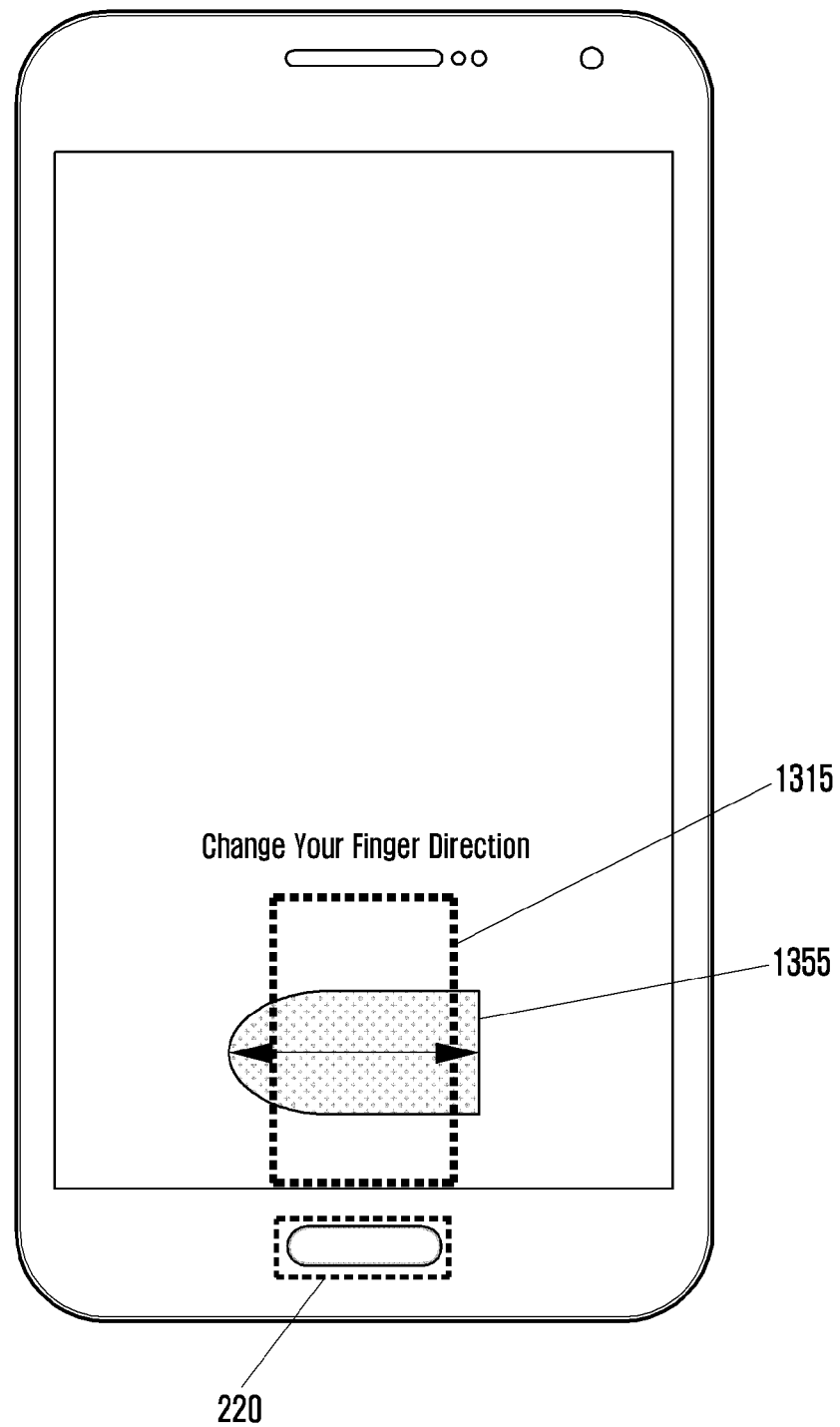

FIG. 12 is a flowchart illustrating a fingerprint recognition method via an inducement of a finger touch while analyzing a finger touched area, lengths of a major axis/minor axis of the touched area, and orientations of the touched area in an electronic device according to an embodiment of the present invention. FIGS. 13A to 13B illustrate display examples of text data displayed on the display unit 230 when an electronic device performs a fingerprint recognition process according to an embodiment of the present invention. Referring to FIGS. 12, 13A, and 13B, when a fingerprint registration mode is set in the setting mode, the controller 201 detects the fingerprint registration in step 1211. The controller 201 displays a fingerprint input guide area 1315 on the display unit 230 in step 1213. The fingerprint input guide area 1315 may be configured in an area of the display unit 230 near the fingerprint scan sensor 220. Further, the fingerprint input guide area 1315 has a size sufficiently large to contain a whole fingerprint, in addition, when the fingerprint input guide area 1315 is displayed, the controller 201 displays text data (for example, "Place your finger on the area") to induce a whole finger pad touch on the fingerprint input guide area 1315 in step 1213 as indicated by reference numeral 1310 of FIG. 13A.

The controller 201 displays the fingerprint guide area 1315 and text data to induce a touch as indicated by reference numeral 1315 of FIG. 13A. When the user touches the fingerprint input guide area 1315, the controller 201 detects the touch via the input unit 240 in step 1215. The controller 201 identifies a touched area in the fingerprint input guide area 1315 in step 1217. The controller 201 compares the identified touched area with a preset touched area in step 1219. When the identified touched area is less than the preset touched area, the controller 201 detects it in step 1219. The controller 201 displays data (for example, "Put more of your finger into the area") to induce a greater finger touched area on the display unit 230 in step 1221 as indicated by reference numeral 1320 of FIG. 13A. In this case, only a fingertip may be scanned as illustrated in FIG. 4A. When the touch as illustrated in FIG. 4A is detected, the controller 201 displays data to induce a sufficiently large finger touch (for example, a touch made by one whole section of the finger) in step 1221 as illustrated in FIG. 4B. The controller 201 then returns to step 1215 to wait for a touch input.

When a touch input is detected in a state where the user is induced to provide a new touch input, the controller 201 identifies a touched area in step 1215. However, when the touched area is less than the preset touched area, the controller 201 displays data (for example, "Put more of your finger into the area") to induce a sufficiently large finger touch in step 1221 as indicated by reference numeral 1330 of FIG. 13A. The controller 201 then returns to step 1215.

However, when the touched area is greater than or equal to the preset touched area, the controller 201 identifies lengths of the major axis/minor axis of the finger touched area in step 1223. The controller 201 compares the length of the major axis of the touched area with a preset length in step 1225. When the length of the major axis is less than the preset length based on a comparison result, the controller 201 returns to step 1221 to display data to induce a new touch input. In general, when it is identified that the touched area is greater than or equal to a preset size, the length of the major axis of the touched area has a value greater than or equal to a preset length. For example, the touched area may meet a preset area condition, but the length of the major axis may not meet a preset length condition, since a fingerprint part is large.

When the touched area and the length of the major axis of the touched area meet the preset conditions, the controller 201 identifies an orientation of the touched finger in step 1227. When an orientation of the major axis of the finger matches the fingerprint input guide area 1315, the touch is determined as a forward touch. When the orientation of the major axis of the finger does not match the fingerprint input guide area 1315, the touch is determined as a backward touch. When the finger touch is not the forward touch, as indicated by reference numeral 1355 of FIG. 13B, the controller 201 displays a text message to induce the forward finger touch on the display unit 230 in step 1231. The controller 201 then returns to step 1215. In this case, the user identifies text data (for example, text data inducing a change in the touch orientation) displayed on the display unit 230, changes the finger orientation, and touches the fingerprint input guide area 1315.

When the forward finger touch is detected in step 1229, the controller 201 displays data (for example, "Swipe your finger over the home key") to induce a fingerprint scan on the display unit 230 in step 1251 as indicated by reference numeral 1340 of FIG. 13A. For example, when a sufficiently large finger touch input is detected in the fingerprint input guide area 1315, the controller 201 displays text data to induce the fingerprint scan on the display unit 230. When the user identifies the inducement data and performs a swipe action in a direction of the fingerprint scan sensor 220 with the finger, the controller 201 detects the swipe action in step 1253. The controller 210 recognizes fingerprint information detected by the fingerprint scan sensor 220 in step 1255. Then, the controller 201 registers the recognized fingerprint information in the storage unit 210 in step 1257.

FIG. 12 illustrates determining all of the conditions, including the touched area, the lengths of the major axis/minor axis of the touched area, and the touch orientations (or touch angles). In this case, the controller 201 induces a touch input while displaying the fingerprint input guide area 1315 to allow the user to put a finger on the TSP before fingerprint recognition. When the user's finger touches the TSP, the controller 201 determines a finger state by using all types of touch event values (e.g., the touched area, the touch angle, and/or touch pressure). The touch event values output from the input unit 240 may be the following values. First, coordinates may be x and y coordinate values which the finger touches. With respect to the major axis/minor axis of the touched area, a long axis of the finger touched area indicates the major axis and a short axis indicates the minor axis. For example, in an Android type device, the major axis is defined by ABS_MT_TOUCH_MAJOR:=max(X, Y) and the minor axis is defined by ABS_MT_TOUCH_MINOR:=min(X, Y). X and U values indicate lengths of X and Y axes for a touch event. Since the finger orientation (e.g. touch angle) of the touched area indicating whether the finger is vertically or horizontally touched cannot be recognized via the major axis/minor axis alone, information on the orientation may also be used. In the Android type device, the orientation may be defined by ABS_MT_ORIENTATION:=bool(X>Y). The touched area indicates an area of a finger touched part.

A fingerprint area by the finger touch may be analyzed based on touched area and/or the lengths of the major axis/minor axis. For example, when the user touches the touch screen while placing a finger such that a fingerprint part contacts the touch screen, it may be generally identified that the touched area and the length of the major axis of the touched area are greater than or equal to a preset area and a preset length, respectively. During the fingerprint recognition process, although only one touch event condition between the touched area and the lengths of the major axis/minor axis of the touched area is used, the same effect can be obtained.

Further, a finger touch orientation (e.g. touch angle) in the guide area may also be considered. When the user touches the fingerprint input guide area 1315 horizontally with a finger, the fingerprint goes beyond a scan range of the fingerprint scan sensor 220 in the fingerprint scan. When horizontal and vertical lengths of the touch event are X and Y, respectively, major axis=max(X, Y), minor axis=min(X, Y), and orientation=(X>Y). The controller 201 cannot determine whether the input is an x-axially long input or a y-axially long input (for example, whether the finger is horizontally or vertically oriented) via the values of the major axis and the minor axis alone. The controller 201 performs an accurate fingerprint scan operation by using orientation information when the fingerprint scan operation is performed.

As described above, as a part of the finger which touches the TSP goes from a fingertip to a whole finger pad, a major axis length and a value of the touched area become larger. The controller 201 determines whether the user uses the fingertip or the finger pad based on the major axis value and/or an area value. When the user uses the fingertip, the controller 201 displays a message instructing the user to lay the finger flatter. Further, when the user performs a horizontal finger touch as illustrated in FIG. 13B, the horizontal finger touch is determined based on an orientation value. When it is identified that one section of the finger touch is made based on the determined touch event value, the controller 201 outputs guide information indicating a fingerprint scan in a direction of the fingerprint scan sensor 220 for fingerprint recognition.

Figure 14:
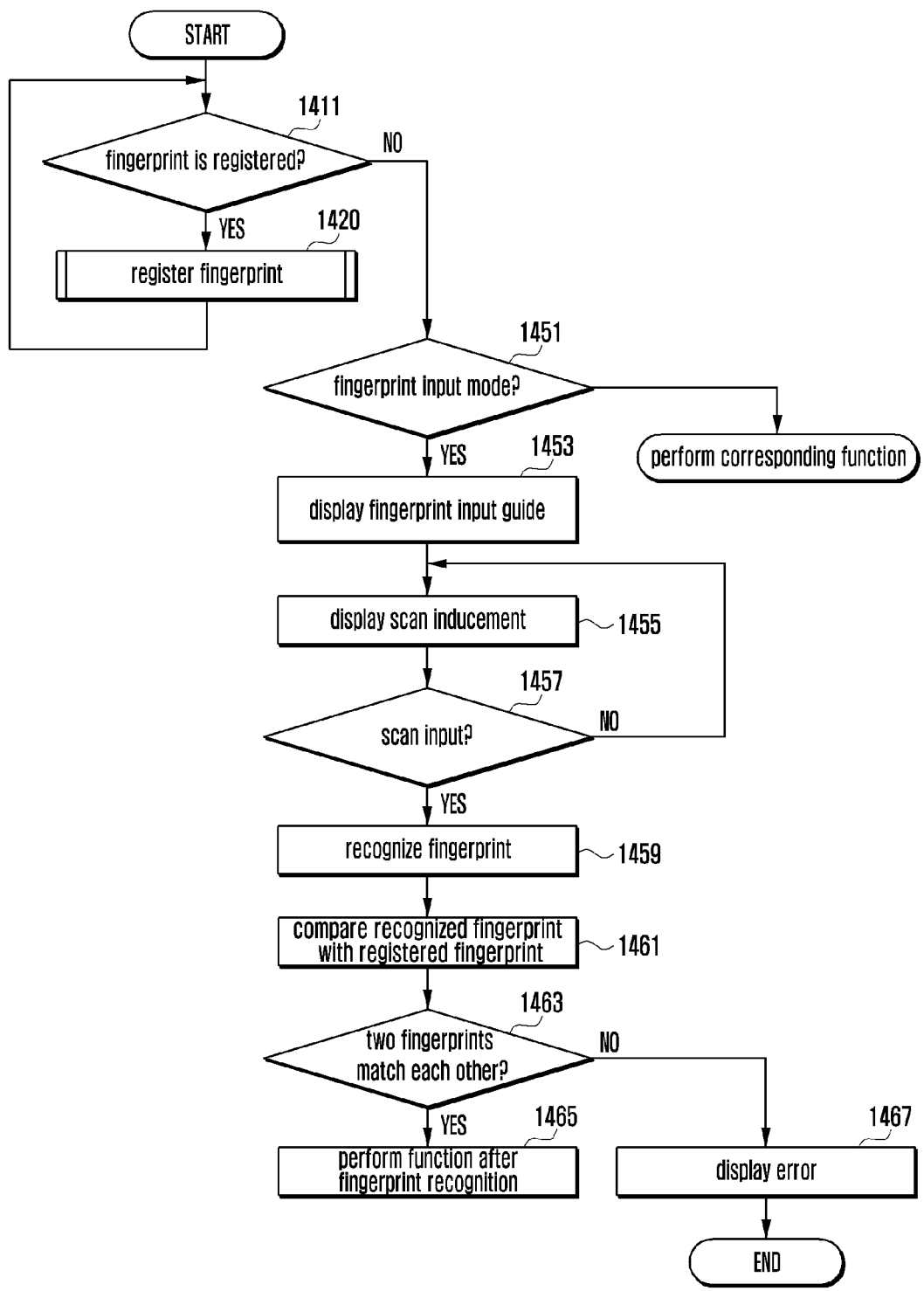
FIG. 14 is a flowchart of a method in which an electronic device performs a function using registered fingerprint information according to an embodiment of the present invention.

FIG. 14 is a flowchart of a method in which an electronic device performs a function using registered fingerprint information according to an embodiment of the present invention. Referring to FIG. 14, when the fingerprint registration mode is set, the controller 201 detects the fingerprint registration mode in step 1411 and performs a process of the fingerprint registration mode in step 1420. The fingerprint registration mode is executed via the same method as that of FIG. 9, 11, or 12.

In a state where the fingerprint is registered, the fingerprint registration mode is executed. In the fingerprint registration mode, a lock screen state or applications having a security function is executed. The controller 201 recognizes the fingerprint registration mode in step 1451. The controller 201 displays a fingerprint input guide area on the display unit 230 in step 1453. Thereafter, the controller 201 displays data to induce a fingerprint scan on the display unit 230 in step 1455. The user performs a scan operation from the fingerprint input guide area or only in the fingerprint scan sensor 220. Then, the controller 201 recognizes the fingerprint scanned by the fingerprint scan sensor 220 in step 1450. The controller 201 may ignore a touch input made in the fingerprint input guide area.

After recognizing the fingerprint information scanned by the fingerprint scan sensor 220, the controller 201 compares the recognized fingerprint information with fingerprint information registered in the storage unit 210 in step 1461. When the recognized fingerprint information matches the registered fingerprint information, the controller 201 detects the match in step 1463. The controller 201 performs a function after the fingerprint recognition in step 1465. For example, when the fingerprint is scanned in a lock screen state, the controller 201 releases the lock screen state in step 1465. However, when the recognized fingerprint information does not match the registered fingerprint information in step 1463, the controller 201 displays an error message in step 1467 and ends the process.

An electronic device according to an embodiment of the present invention includes an operation for displaying a guide area corresponding to a finger touch in at least some areas of the display unit, and an operation for providing guide information related to fingerprint recognition based on a touch detected via the guide area.

The operation for providing the guide information includes an operation for determining one or more attributes related to the touch, an operation for, when the one or more attributes do not meet a predetermined condition, displaying information requesting a changing of the touch, and an operation for, when the one or more attributes meet the predetermined condition, collecting fingerprint information corresponding to the touch via a fingerprint scan sensor adjacent to the guide area.

The touch attribute includes at least one of a touched area, a touch angle, and a touch pressure with respect to the touch.

The operation for analyzing the touch condition includes an operation for comparing a touched area with a preset area, and the operation for displaying the touch change includes an operation for displaying text to induce a larger finger touch in the guide area.

The operation for analyzing the touch condition includes an operation for extracting sizes of a major axis and a minor axis of the touched finger and comparing the extracted sizes of the major axis and the minor axis, and the operation for displaying the touch change includes an operation for displaying text to induce a larger finger touch in the guide area.

The operation for analyzing the touch condition includes an operation for analyzing an orientation of the touched finger, and the operation for displaying the touch change includes an operation for displaying text to induce a forward finger touch in the guide area.

The operation for analyzing the touch condition includes an operation for comparing a touched area with a preset area and an operation for analyzing an orientation of the touched finger, and the operation for displaying the touch change includes an operation for displaying text to induce a larger finger touch in the guide area when the touched area is less than the preset area and an operation for displaying text to induce a forward finger touch when the finger backwardly touches the guide area.

The operation for analyzing the touch condition includes an operation for comparing a touched area with a preset area, an operation for extracting sizes of a major axis and a minor axis of the touched finger and comparing the extracted sizes of the major axis and the minor axis, an operation for analyzing an orientation of the touched finger, and the operation for displaying the touch change includes an operation for displaying text to induce a larger finger touch in the guide area when the touched area is less than the preset area, and an operation for displaying text inducing a forward finger touch when the finger backwardly touches the guide area.

The electronic device further includes an operation for processing a fingerprint input mode after registering the fingerprint information. The operation for processing the fingerprint input mode includes an operation for displaying the guide area on the display unit, an operation for displaying a fingerprint scan, an operation for comparing a fingerprint scanned when the fingerprint scan is detected with the registered fingerprint, and an operation for processing the fingerprint input mode when the scanned fingerprint matches the registered fingerprint.

The fingerprint input mode is a mode for releasing a lock screen, and the operation for processing the fingerprint input mode comprises releasing a lock of a screen.

A method of registering a fingerprint by an electronic device according to an embodiment of the present invention includes an operation for displaying a guide area for a finger touch in a fingerprint mode on a display unit and displaying information instructing a user to place a finger in the guide area, and an operation for analyzing a touched area and a preset area when a touch is detected in the guide area, an operation for displaying information instructing a larger finger touch when the touched area is less than the preset area, and an operation for collecting fingerprint information corresponding to the touch via a fingerprint scan sensor located at a lower portion of the guide area when the touched area is greater than the preset area.

The method further includes an operation for processing a fingerprint input mode after registering the fingerprint information. The operation for processing the fingerprint input mode includes an operation for displaying the guide area on the display unit, an operation for displaying a fingerprint scan, an operation for comparing a fingerprint scanned when the fingerprint scan is detected with the registered fingerprint, and an operation for processing the fingerprint input mode when the scanned fingerprint matches the registered fingerprint.

The term "module" according to an embodiment of the present invention, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of an Application-Specific Integrated Circuit (ASIC), Field-Programmable Gate Arrays (FPGAs), and a Programmable-Logic Device known or to be developed for certain operations.

According to an embodiment of the present invention, the devices (e.g. modules or their functions) or methods may be implemented by computer program instructions stored in a non-transitory computer-readable storage medium, in the case that the instructions are executed by at least one processor (e.g. processor 120), the at least one processor executes the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The non-transitory computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The program commands include language code executable by computers using an interpreter as well as machine language code created by a compiler. The aforementioned hardware device can be implemented with one or more software modules for executing the operations of an embodiment of the present invention.

According to an embodiment of the present invention, a recording medium implemented in an electronic device including a fingerprint scan sensor displays a guide area corresponding to a finger touch in at least some areas of a display unit and provides guide information related to fingerprint recognition based on a touch detected via the guide area.

According to an embodiment of the present invention, a recording medium implemented in an electronic device including a fingerprint scan sensor displays a guide area for a finger touch in a fingerprint mode on a display unit, displays information instructing a user to place a finger in the guide area, analyzes a touched area and a preset area when a touch is detected in the guide area, displays information instructing a larger finger touch when the touched area is less than the preset area, displays the beginning of a fingerprint scan via a fingerprint scan sensor located at a lower portion of the guide area when the touched area is greater than the preset area, and recognizes and register scanned fingerprint information.

The module or programming module of the present invention may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

While embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the scope and spirit of the present invention, as defined by the appended claims and their equivalents.

What is claimed is:

1. A method of recognizing a fingerprint, comprising:
receiving a request for a fingerprint mode;
in response to the request for the fingerprint mode, displaying a guide area, the guide area located in at least one area of a display unit adjacent to a fingerprint scan sensor;
receiving a finger touch for performing a fingerprint scan via the guide area;
providing guide information related to fingerprint recognition based on the finger touch detected via the guide area by determining at least one attribute related to the finger touch; and
displaying, when the at least one attribute does not meet a predetermined condition, information making a request for changing the finger touch,
wherein displaying the information making the request for changing the finger touch comprises extracting sizes of a major axis and a minor axis of the finger touch, and comparing the extracted sizes of the major axis and the minor axis.

2. The method of claim 1, wherein providing the guide information further comprises:
collecting, when the at least one attribute meets the predetermined condition, fingerprint information corresponding to the finger touch via the fingerprint scan sensor.

3. The method of claim 1, wherein the at least one attribute includes at least one of a touched area, a touch angle, and a touch pressure related to the finger touch.

4. The method of claim 1, wherein displaying information making the request for changing the finger touch comprises comparing a touched area to a preset area, and displaying text to induce a larger finger touch in the guide area.

5. The method of claim 1, further comprising:
displaying text to induce a larger finger touch in the guide area.

6. The method of claim 1, wherein displaying information making the request for changing the finger touch comprises analyzing an orientation of the finger touch, and displaying text to induce a forward finger touch in the guide area.

7. The method of claim 1, wherein displaying information making the request for changing the finger touch comprises:
comparing a touched area with a preset area;
analyzing an orientation of the finger touch;
displaying text to induce a larger finger touch in the guide area when the touched area is less than the preset area; and
displaying text to induce a forward finger touch when the finger backwardly touches the guide area.

8. The method of claim 1, wherein displaying information making the request for changing the finger touch comprises:
comparing a touched area with a preset area;
analyzing an orientation of the finger touch;
displaying text to induce a larger finger touch in the guide area when the touched area is less than the preset area; and
displaying text to induce a forward finger touch when the finger backwardly touches the guide area.

9. The method of claim 1, further comprising processing a fingerprint input mode after registering the fingerprint information, wherein processing the fingerprint input mode comprises:
displaying the guide area on the display unit and displaying the fingerprint scan;
comparing the fingerprint scan, when the fingerprint scan is detected, to the registered fingerprint information; and
processing the fingerprint input mode when the fingerprint scan matches the registered fingerprint information.

10. The method of claim 9, wherein the fingerprint input mode is a mode for releasing a lock screen, and wherein processing of fingerprint input mode further comprises releasing a lock of a screen.

11. An apparatus for recognizing a fingerprint, comprising:
a fingerprint scan sensor;
a display unit;
a controller configured to control operations of:
receiving a request for a fingerprint mode,
in response to the request for the fingerprint mode, displaying a guide area corresponding to a location where a finger touch for performing a fingerprint scan is to be received, the guide area located in at least one area of the display unit adjacent to the fingerprint scan sensor,
receiving a finger touch for performing the fingerprint scan via the guide area,
providing guide information related to fingerprint recognition based on the finger touch detected via the guide area by determining at least one attribute related to the finger touch; and
displaying, when the at least one attribute does not meet a predetermined condition, information making a request for changing the finger touch,
wherein displaying the information making the request for changing the finger touch comprises extracting sizes of a major axis and a minor axis of the finger touch, and comparing the extracted sizes of the major axis and the minor axis.

12. The apparatus of claim 11, wherein the controller is further configured to:
collect fingerprint information corresponding to the finger touch via the fingerprint scan sensor, when the at least one attribute meets the predetermined condition.

13. The apparatus of claim 11, wherein the at least one attribute includes at least one of a touched area, a touch angle, and a touch pressure related to the finger touch.

14. The apparatus of claim 11, wherein the fingerprint scan sensor is installed in a home button.

15. The apparatus of claim 11, wherein the controller is further configured to:
compare a touched area with a preset area, and
display text to induce a larger finger touch in the guide area of the display unit when the touched area is less than the preset area.

16. The apparatus of claim 11, wherein the controller is further configured to:
display text to induce a larger finger touch in the guide area when the size of the major axis is less than a preset size.

17. The apparatus of claim 11, wherein the controller is further configured to:
analyze an orientation of the finger touch, and
display text to induce a forward finger touch in the guide area when the finger is backwardly oriented.

18. The apparatus of claim 11, wherein the controller is further configured to:
compare a touched area with a preset area,
analyze an orientation of the finger touch,
display text to induce a larger finger touch in the guide area when the touched area is less than the preset area, and
display text to induce a forward finger touch when the finger backwardly touches the guide area.

19. The apparatus of claim 11, wherein the controller is further configured to:
process a fingerprint input mode after registering the fingerprint information,
display the guide area on the display unit in the fingerprint input mode,
recognize a fingerprint scanned by the fingerprint scan sensor to compare the recognized fingerprint scanned with the registered fingerprint information, and
process the fingerprint input mode when the fingerprint scanned matches the registered fingerprint information.

20. The apparatus of claim 19, wherein the fingerprint input mode is a mode for releasing a lock screen, and
the controller is further configured to release the lock screen when a fingerprint recognized in a fingerprint input mode matches a registered fingerprint.

21. A method of registering a fingerprint by an electronic device, the method comprising:
receiving a request for a fingerprint mode;
in response to the request for the fingerprint mode, displaying a guide area, the guide area located in an area of a display unit adjacent to a fingerprint scan sensor;
displaying guide information instructing a user to place a finger in the guide area by determining at least one attribute related to the finger touch;
displaying, when the at least one attribute does not meet a predetermined condition, information making a request for changing the finger touch;
analyzing a touched area and a preset area when the finger touch is detected in the guide area;
displaying information instructing a larger finger touch when the touched area is less than the preset area; and
collecting fingerprint information corresponding to the finger touch via the fingerprint scan sensor, when the touched area is greater than the preset area,
wherein displaying the information making the request for changing the finger touch comprises extracting sizes of a major axis and a minor axis of the finger touch, and comparing the extracted sizes of the major axis and the minor axis.

22. The method of claim 21, further comprising processing a fingerprint input mode after registering the fingerprint information, wherein processing the fingerprint input mode comprises:
displaying the guide area on the display unit;
displaying a beginning of the fingerprint scan;
comparing the fingerprint scan, when the fingerprint scan is detected, to the registered fingerprint; and
processing the fingerprint input mode when the fingerprint scan matches the registered fingerprint.

23. A non-transitory computer-readable recording medium implemented in an electronic device including a fingerprint scan sensor, the non-transitory computer-readable recording medium:
displays a guide area, the guide area located in at least one area of a display unit adjacent to the fingerprint scan sensor, and
provides guide information related to fingerprint recognition based on the finger touch detected via the guide area by determining at least one attribute related to the finger touch; and
displaying, when the at least one attribute does not meet a predetermined condition, information making a request for changing the finger touch,
wherein displaying the information making the request for changing the finger touch comprises extracting sizes of a major axis and a minor axis of the finger touch, and comparing the extracted sizes of the major axis and the minor axis.

24. A non-transitory computer-readable recording medium implemented in an electronic device including a fingerprint scan sensor, the non-transitory computer-readable recording medium:
displays a guide area, the guide area located in an area of a display unit adjacent to the fingerprint scan sensor,
displays guide information instructing a user to place a finger in the guide area,
analyzes a touched area and a preset area when the finger touch is detected in the guide area,
displays information instructing a larger finger touch when the touched area is less than the preset area, and
displays a beginning of the fingerprint scan via the fingerprint scan sensor when the touched area is greater than the preset area, and recognizes and registers scanned fingerprint information.

* * * * *